US010937215B1

(12) United States Patent
Iskandar

(10) Patent No.: US 10,937,215 B1
(45) Date of Patent: Mar. 2, 2021

(54) TECHNIQUES FOR ENABLING DRAWING IN A COMPUTER-GENERATED REALITY ENVIRONMENT

(71) Applicant: Apple Inc., Cupertino, CA (US)

(72) Inventor: Edwin Iskandar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/144,825

(22) Filed: Sep. 27, 2018

Related U.S. Application Data

(60) Provisional application No. 62/565,809, filed on Sep. 29, 2017.

(51) Int. Cl.
*G09G 5/00* (2006.01)
*G06T 11/60* (2006.01)
*G06F 3/01* (2006.01)

(52) U.S. Cl.
CPC .............. *G06T 11/60* (2013.01); *G06F 3/017* (2013.01)

(58) Field of Classification Search
CPC ................. G09G 5/14; G09G 2340/10; G09G 2340/125; G06T 11/60; G06T 15/503
USPC ......................................................... 345/629
See application file for complete search history.

(56) References Cited

U.S. PATENT DOCUMENTS

| | | | | |
|---|---|---|---|---|
| 2005/0062738 A1* | 3/2005 | Handley | .............. | G06F 3/0346 345/419 |
| 2011/0202856 A1* | 8/2011 | Handley | ................. | G06F 3/016 715/764 |
| 2012/0229590 A1* | 9/2012 | Barrus | ................ | H04L 12/1822 348/14.08 |
| 2015/0363035 A1* | 12/2015 | Hinckley | .............. | G06F 3/0383 345/173 |
| 2018/0300008 A1* | 10/2018 | Rasanen | ............... | G06F 3/0416 |
| 2019/0019348 A1* | 1/2019 | Yamamoto | .............. | G06T 19/20 |

* cited by examiner

*Primary Examiner* — Gordon G Liu
(74) *Attorney, Agent, or Firm* — Dentons US LLP

(57) ABSTRACT

The present disclosure relates to techniques for providing an interactive computer-generated reality environment for creating a virtual drawing using one or more electronic devices. Specifically, the described techniques provide a user with a computer-generated reality environment, which can be based on different types of realities including virtual reality and mixed reality, for creating a virtual drawing on a drawing surface within the computer-generated reality environment. The computer-generated reality environment provides the user with a realistic and immersive experience while creating the virtual drawing.

25 Claims, 22 Drawing Sheets

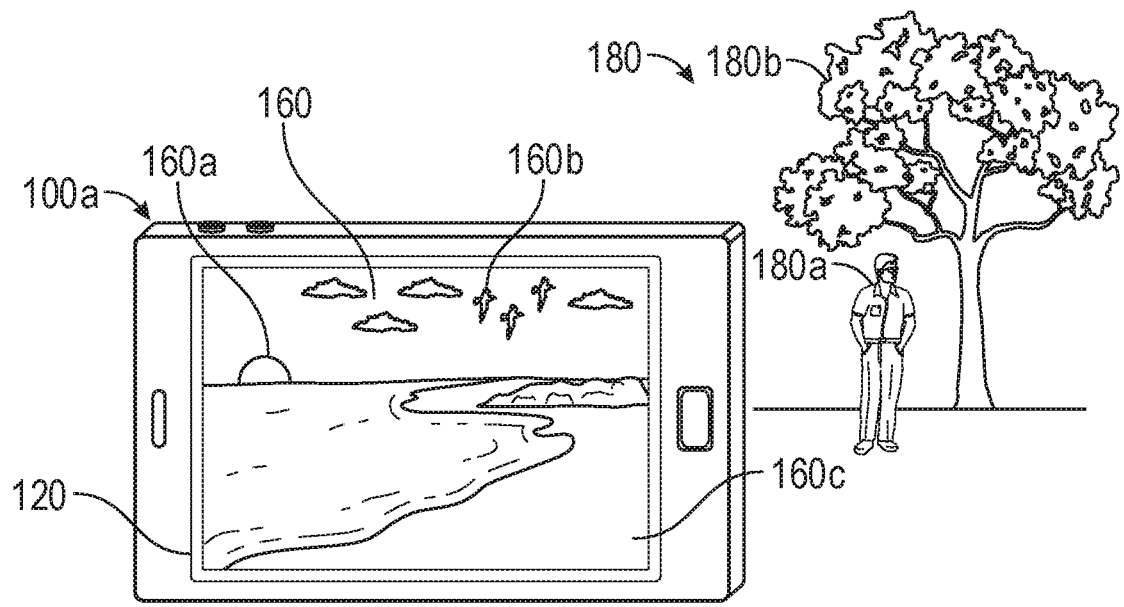
FIG. 1C  Virtual Reality
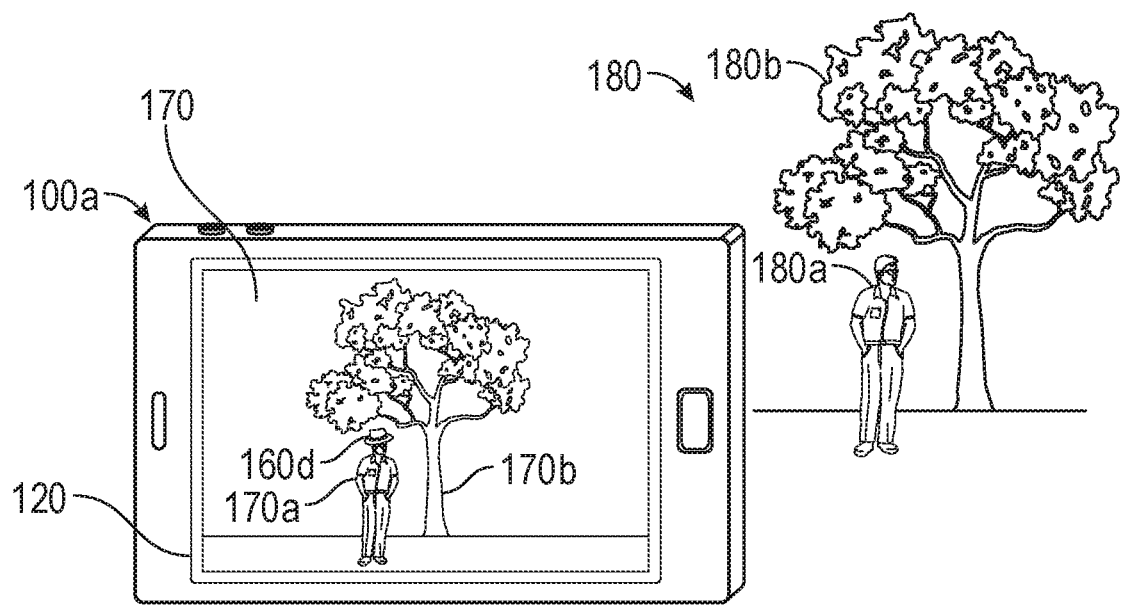
FIG. 1D  Augmented Reality (pass-through video)

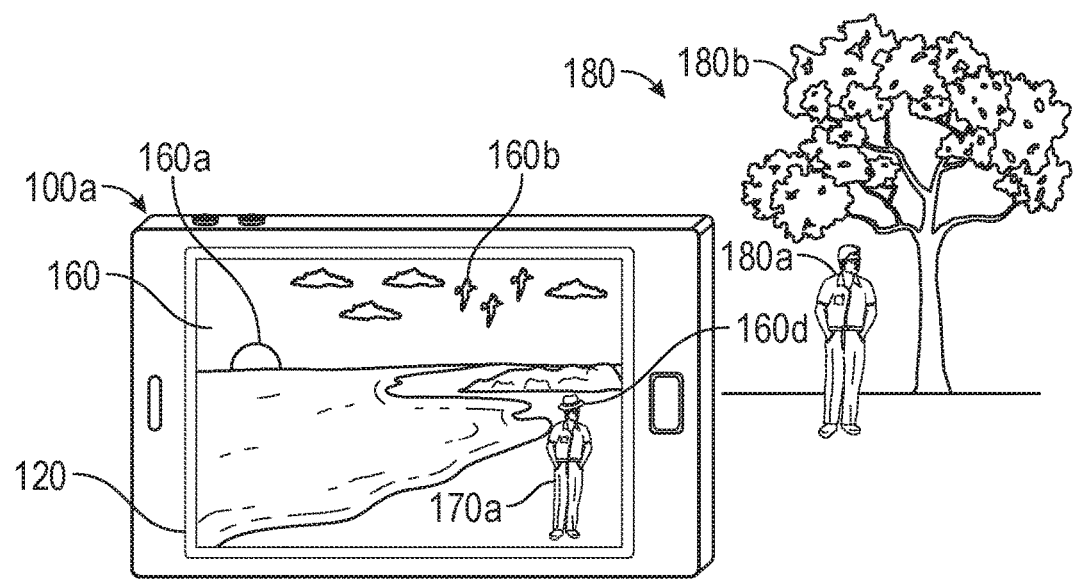
FIG. 1E  Augmented Virtuality
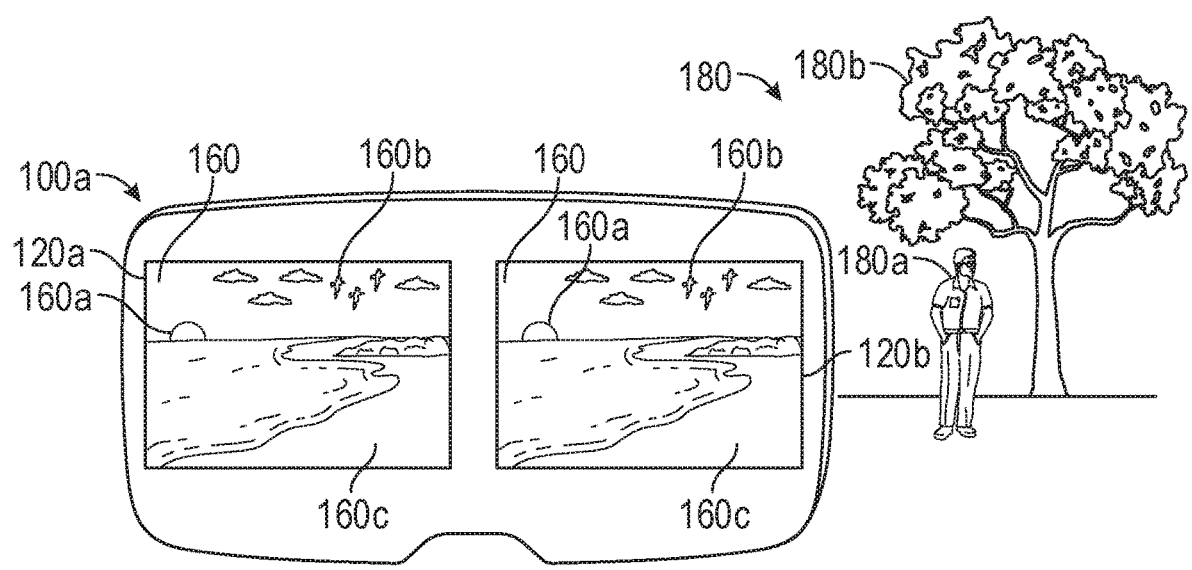
FIG. 1F  Virtual Reality

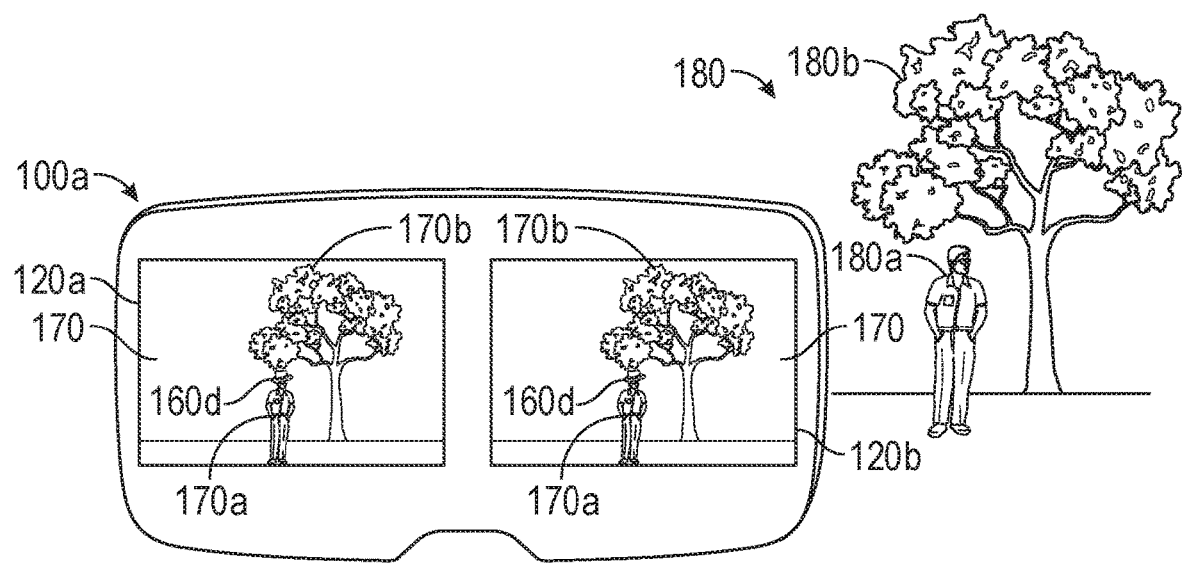
FIG. 1G   Augmented Reality (pass-through video)
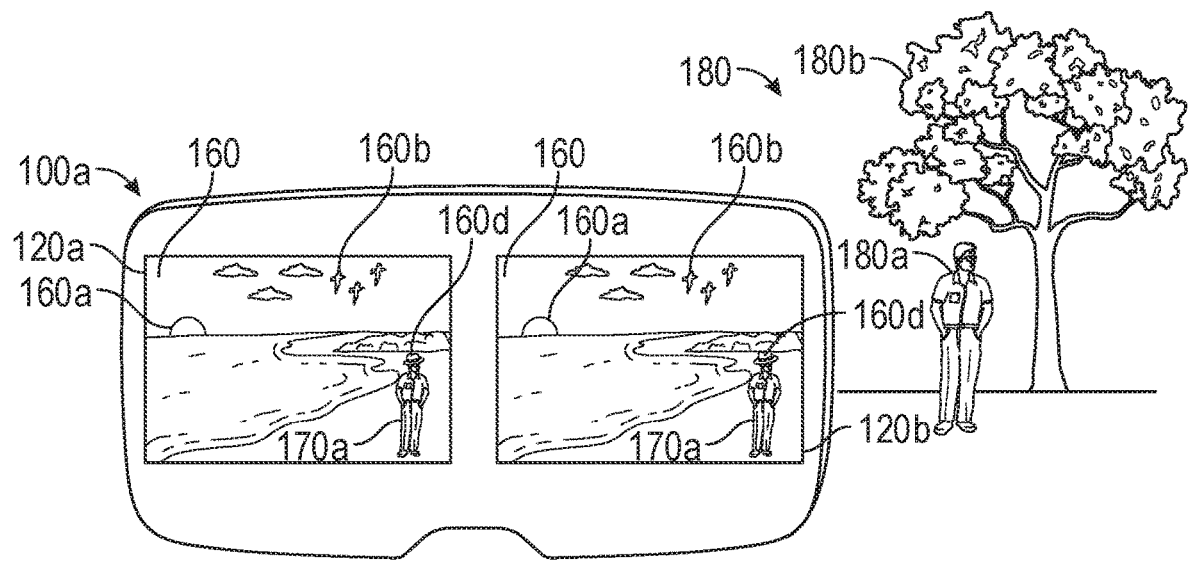
FIG. 1H   Augmented Virtuality

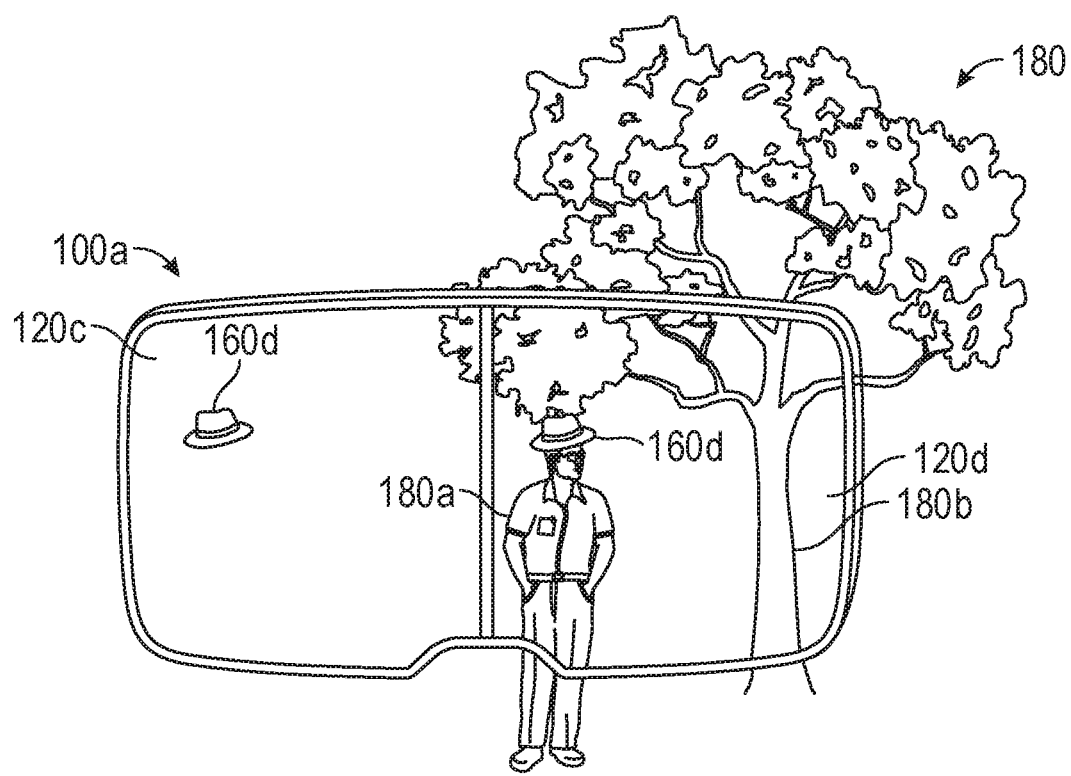
FIG. 1I    Augmented Reality (heads-up display)

ved reality environment, and more specifically to techniques for -->

TECHNIQUES FOR ENABLING DRAWING IN A COMPUTER-GENERATED REALITY ENVIRONMENT

CROSS-REFERENCE TO RELATED APPLICATIONS

This application claims priority to U.S. Provisional Application Ser. No. 62/565,809, entitled "Techniques for Enabling Drawing in a Virtual Environment," filed Sep. 29, 2017, the contents of which are hereby incorporated by reference in their entirety.

FIELD

This application relates generally to a computer-generated reality environment, and more specifically to techniques for providing an interactive computer-generated reality environment for creating a virtual drawing.

BACKGROUND

A computer-generated reality (CGR) environment refers to a wholly or partially simulated environment that people sense and/or interact with via an electronic system. A CGR environment can be based on different types of realities, including virtual reality and mixed reality. An electronic device optionally detects a user's real movements and projects and simulates those movements within the CGR environment.

BRIEF SUMMARY

The present disclosure describes techniques for providing an interactive computer-generated reality (CGR) environment for creating a virtual drawing on a drawing surface using an electronic system or device, where the CGR environment provides a user with a realistic and immersive experience while creating the virtual drawing as if the user was creating a real drawing in the real world. Thus, the described techniques enable a user to create a drawing without the need for traditional physical drawing tools. Further, because the drawing is created within a CGR environment, the described techniques allow a user to easily and efficiently manipulate (e.g., change, erase, alter) a portion of a drawing as desired. As such, the described techniques enable a user to experience creating a virtual drawing within a CGR environment as if the user were creating a real drawing in the real environment, while simultaneously reducing some inconveniences associated with creating a real drawing in the real environment.

Further, the described techniques are not limited to a particular type of CGR environment but rather can be implemented utilizing any type of CGR environment. As described in greater detail below, examples of CGR include, for example, virtual reality and mixed reality.

In accordance with some embodiments, an electronic device is described. The electronic device comprises one or more processors and memory storing one or more programs configured to be executed by the one or more processors, the one or more programs including instructions for: causing display, on a display, of a drawing surface within a computer-generated reality environment; detecting, using one or more image sensors, a first input including a first predefined finger orientation type; and upon detecting the first input, drawing on the drawing surface within the computer-generated reality environment responsive to hand movement detected using the one or more image sensors, wherein drawing on the drawing surface within the computer-generated reality environment responsive to the hand movement comprises producing a visual effect on the drawing surface within the computer-generated reality environment corresponding to the detected hand movement.

In accordance with some embodiments, a method is described. The method comprises: causing display, on a display, of a drawing surface within a computer-generated reality environment; detecting, using one or more image sensors, a first input including a first predefined finger orientation type; and upon detecting the first input, drawing on the drawing surface within the computer-generated reality environment responsive to hand movement detected using the one or more image sensors, wherein drawing on the drawing surface within the computer-generated reality environment responsive to the hand movement comprises producing a visual effect on the drawing surface within the computer-generated reality environment corresponding to the detected hand movement.

In accordance with some embodiments, a non-transitory computer-readable storage medium is described. The non-transitory computer-readable storage medium storing one or more programs configured to be executed by one or more processors of an electronic device, the one or more programs including instructions for: causing display, on a display, of a drawing surface within a computer-generated reality environment; detecting, using one or more image sensors, a first input including a first predefined finger orientation type; and upon detecting the first input, drawing on the drawing surface within the computer-generated reality environment responsive to hand movement detected using the one or more image sensors, wherein drawing on the drawing surface within the computer-generated reality environment responsive to the hand movement comprises producing a visual effect on the drawing surface within the computer-generated reality environment corresponding to the detected hand movement.

In accordance with some embodiments, a transitory computer-readable storage medium is described. The non-transitory computer-readable storage medium storing one or more programs configured to be executed by one or more processors of an electronic device, the one or more programs including instructions for: causing display, on a display, of a drawing surface within a computer-generated reality environment; detecting, using one or more image sensors, a first input including a first predefined finger orientation type; and upon detecting the first input, drawing on the drawing surface within the computer-generated reality environment responsive to hand movement detected using the one or more image sensors, wherein drawing on the drawing surface within the computer-generated reality environment responsive to the hand movement comprises producing a visual effect on the drawing surface within the computer-generated reality environment corresponding to the detected hand movement.

In accordance with some embodiments, an electronic device is described. The electronic device comprises: means for causing display, on a display, of a drawing surface within a computer-generated reality environment; means for detecting, using one or more image sensors, a first input including a first predefined finger orientation type; and means, upon detecting the first input, for drawing on the drawing surface within the computer-generated reality environment responsive to hand movement detected using the one or more image sensors, wherein drawing on the drawing surface within the computer-generated reality environment responsive to the hand movement comprises producing a visual effect on the drawing surface within the computer-generated reality environment corresponding to the detected hand movement.

DESCRIPTION OF THE FIGURES

FIGS. 1C-1E illustrate examples of the system in the form of mobile devices.

FIGS. 1F-1H illustrate examples of the system in the form of head-mounted display devices.

FIG. 1I illustrates an example of the system in the form of a head-up display device.

Figure 1A:
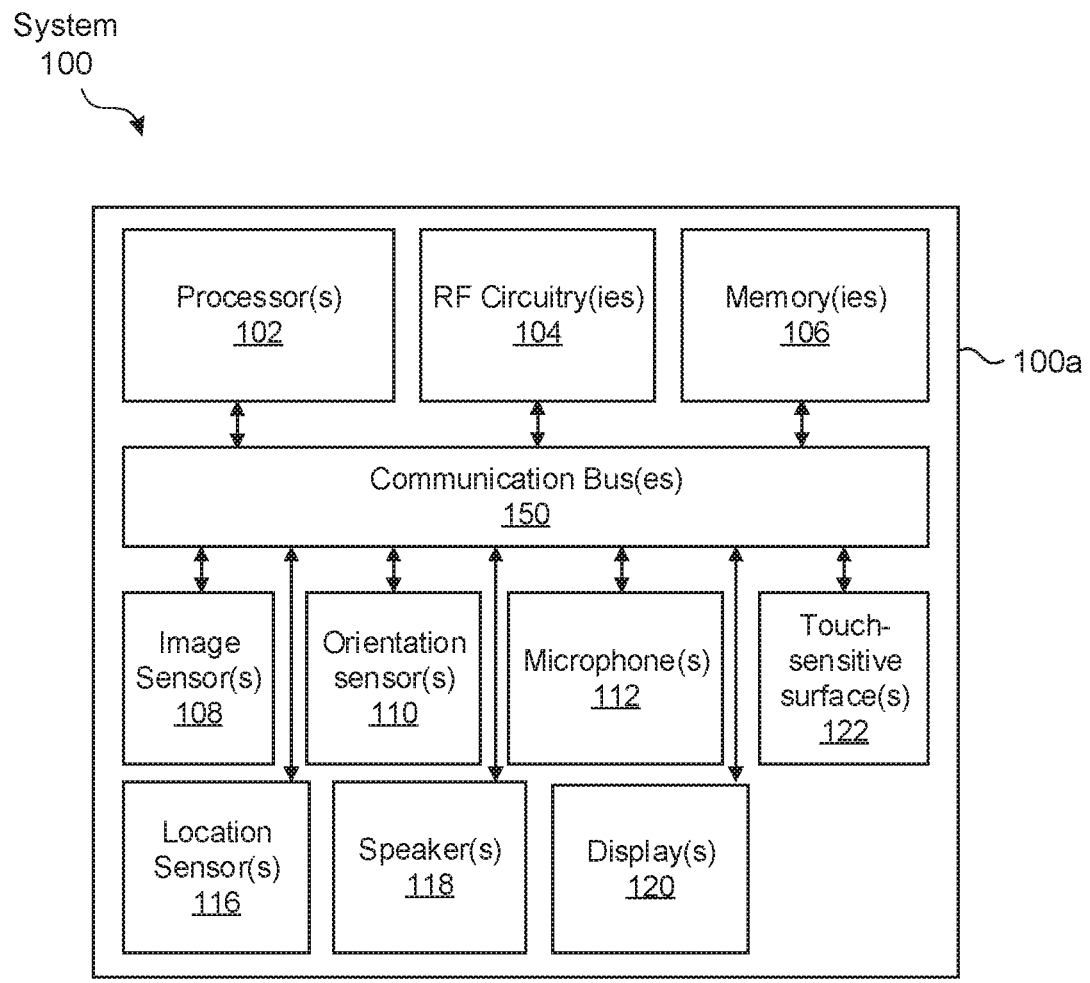
FIGS. 1A-1B depict exemplary systems for use in various computer-generated reality technologies, including virtual reality and mixed reality.

The embodiments depicted in the figures are only exemplary. One skilled in the art will readily recognize from the following discussion that alternative embodiments of the structures and methods illustrated herein can be employed without departing from the principles described herein.

DETAILED DESCRIPTION

Various embodiments of electronic systems and techniques for using such systems in relation to various computer-generated reality technologies, including virtual reality and mixed reality (which incorporates sensory inputs from a physical environment), are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
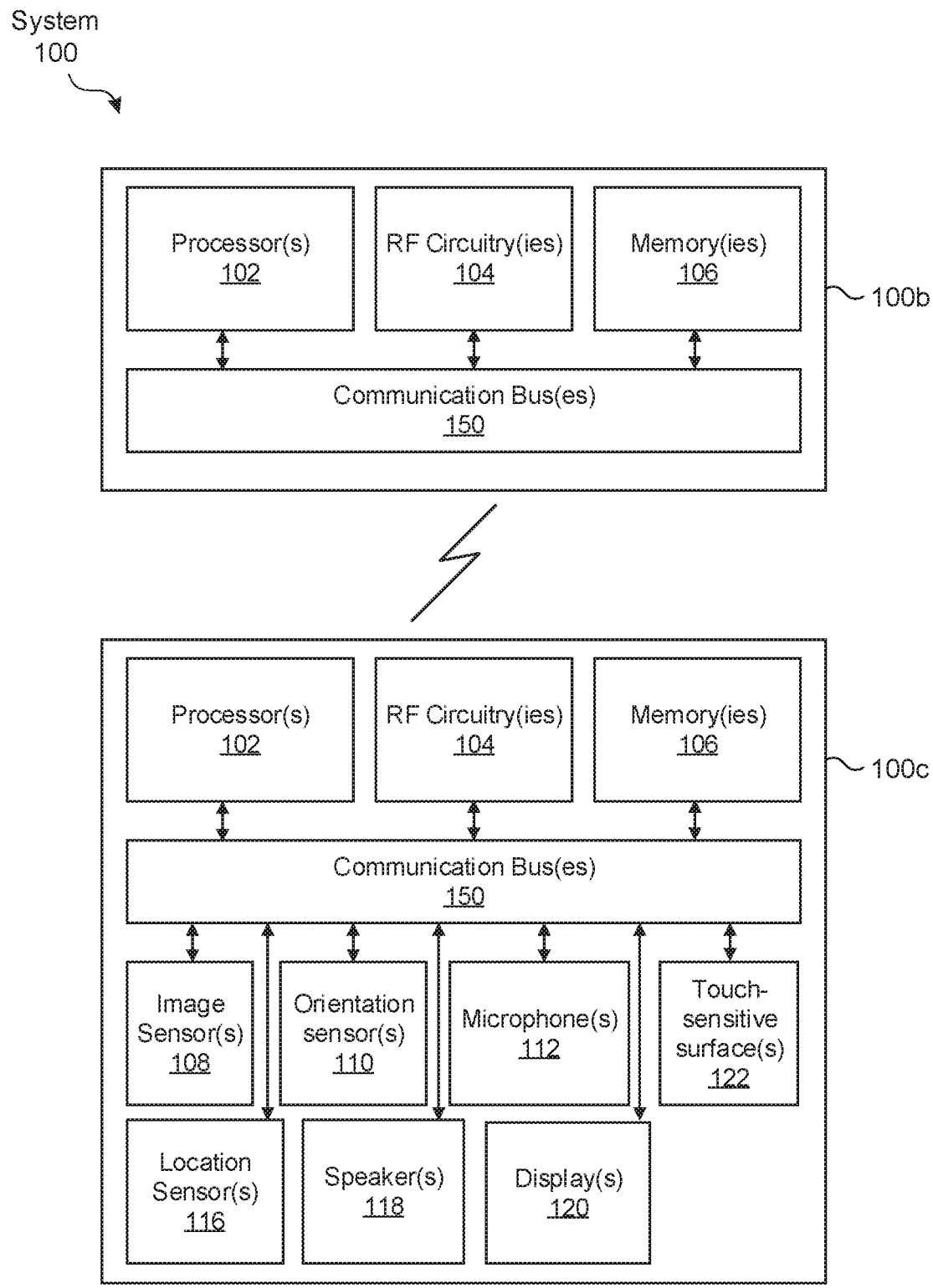

FIG. 1A and FIG. 1B depict exemplary system 100 for use in various computer-generated reality technologies, including virtual reality and mixed reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some embodiments, system 100 is a mobile device, such as in the embodiments described with respect to device 100a in FIGS. 1C-1E. In some embodiments, system 100 is a head-mounted display (HMD) device, such as in the embodiments described with respect to device 100a in FIGS. 1F-1H. In some embodiments, system 100 is a wearable HUD device, such as in the embodiments described with respect to device 100a in FIG. H.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 1C-1E illustrate examples of system 100 in the form of device 100a. In FIGS. 1C-1E, device 100a is a mobile device, such as a cellular phone. FIG. 1C illustrates device 100a carrying out a virtual reality technique. Device 100a is displaying, on display 120, a virtual environment 160 that includes virtual objects, such as sun 160a, birds 160b, and beach 160c. Both the displayed virtual environment 160 and virtual objects (e.g., 160a, 160b, 160c) of the virtual environment 160 are computer-generated imagery.

Note that the virtual reality environment depicted in FIG. 1C does not include representations of physical objects from the real environment 180, such as physical person 180a and physical tree 180b, even though these elements of real environment 180 are within the field of view of image sensor(s) 108 of device 100a.

FIG. 1D illustrates device 100a carrying out a mixed reality technique, and in particular an augmented reality technique, using pass-through video. Device 100a is displaying, on display 120, a representation 170 of the real environment 180 with virtual objects. The representation 170 of the real environment 180 includes representation 170a of person 180a and representation 170b of tree 180b. For example, the device uses image sensor(s) 108 to capture images of the real environment 180 that are passed through for display on display 120. Device 100a overlays hat 160d, which is a virtual object generated by device 100a, on the head of the representation 170a of person 180a. Device 100a tracks the location and/or orientation of physical objects with respect to the position and/or orientation of device 100a to enable virtual objects to interact with physical objects from the real environment in the augmented reality environment. In this example, device 100a accounts for movements of device 100a and person 180a to display hat 160d as being on the head of the representation 170a of person 180a, even as device 100a and person 180a move relative to one another.

FIG. 1E illustrates device 100a carrying out a mixed reality technique, and in particular an augmented virtuality technique. Device 100a is displaying, on display 120, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a in real environment 180. Device 100a places representation 170a of person 180a in virtual environment 160 for display on display 120. Device 100a optionally tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of representation 170a of person 180a. Notably, in this example, device 100a does not display a representation of tree 180b even though tree 180b is also within the field of view of the image sensor(s) of device 100a, in carrying out the mixed reality technique.

FIGS. 1F-1H illustrate examples of system 100 in the form of device 100a. In FIGS. 1F-1H, device 100a is a HMD device configured to be worn on the head of a user, with each eye of the user viewing a respective display 120a and 120b. FIG. 1F illustrates device 100a carrying out a virtual reality technique. Device 100a is displaying, on displays 120a and 120b, a virtual environment 160 that includes virtual objects, such as sun 160a, birds 160b, and beach 160c. The displayed virtual environment 160 and virtual objects (e.g., 160a, 160b, 160c) are computer-generated imagery. In this example, device 100a simultaneously displays corresponding images on display 120a and display 120b. The corresponding images include the same virtual environment 160 and virtual objects (e.g., 160a, 160b, 160c) from different viewpoints, resulting in a parallax effect that provides a user with the illusion of depth of the objects on the displays. Note that the virtual reality environment depicted in FIG. 1F does not include representations of physical objects from the real environment, such as person 180a and tree 180b even though person 180a and tree 180b are within the field of view of the image sensor(s) of device 100a, in carrying out the virtual reality technique.

FIG. 1G illustrates device 100a carrying out an augmented reality technique using pass-through video. Device 100a is displaying, on displays 120a and 120b, a representation 170 of real environment 180 with virtual objects. The representation 170 of real environment 180 includes representation 170a of person 180a and representation 170b of tree 180b. For example, device 100a uses image sensor(s) 108 to capture images of the real environment 180 that are passed through for display on displays 120a and 120b. Device 100a is overlaying a computer-generated hat 160d (a virtual object) on the head of representation 170a of person 180a for display on each of displays 120a and 120b. Device 100a tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of representation 170a of person 180a.

FIG. 1H illustrates device 100a carrying out a mixed reality technique, and in particular an augmented virtuality technique, using pass-through video. Device 100a is displaying, on displays 120a and 120b, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a. Device 100a places the representation 170a of the person 180a in the virtual environment for display on displays 120a and 120b. Device 100a optionally tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of the representation 170a of person 180a. Notably, in this example, device 100a does not display a representation of tree 180b even though tree 180b is also within the field of view of the image sensor(s) 108 of device 100a, in carrying out the mixed reality technique.

FIG. 1I illustrates an example of system 100 in the form of device 100a. In FIG. 1I, device 100a is a HUD device (e.g., a glasses device) configured to be worn on the head of a user, with each eye of the user viewing a respective heads-up display 120c and 120d. FIG. 1I illustrates device 100a carrying out an augmented reality technique using heads-up displays 120c and 120d. The heads-up displays 120c and 120d are (at least partially) transparent displays, thus allowing the user to view the real environment 180 in combination with heads-up displays 120c and 120d. Device 100a is displaying, on each of heads-up displays 120c and 120d, a virtual hat 160d (a virtual object). The device 100a tracks the location and/or orientation of physical objects in the real environment with respect to the position and/or orientation of device 100a and with respect to the position of the user's eyes to enable virtual objects to interact with physical objects from real environment 180. In this example, device 100a accounts for movements of device 100a, movements of the user's eyes with respect to device 100a, and movements of person 180a to display hat 160d at locations on displays 120c and 120d such that it appears to the user that the hat 160d is on the head of person 180a.

Figure 2:
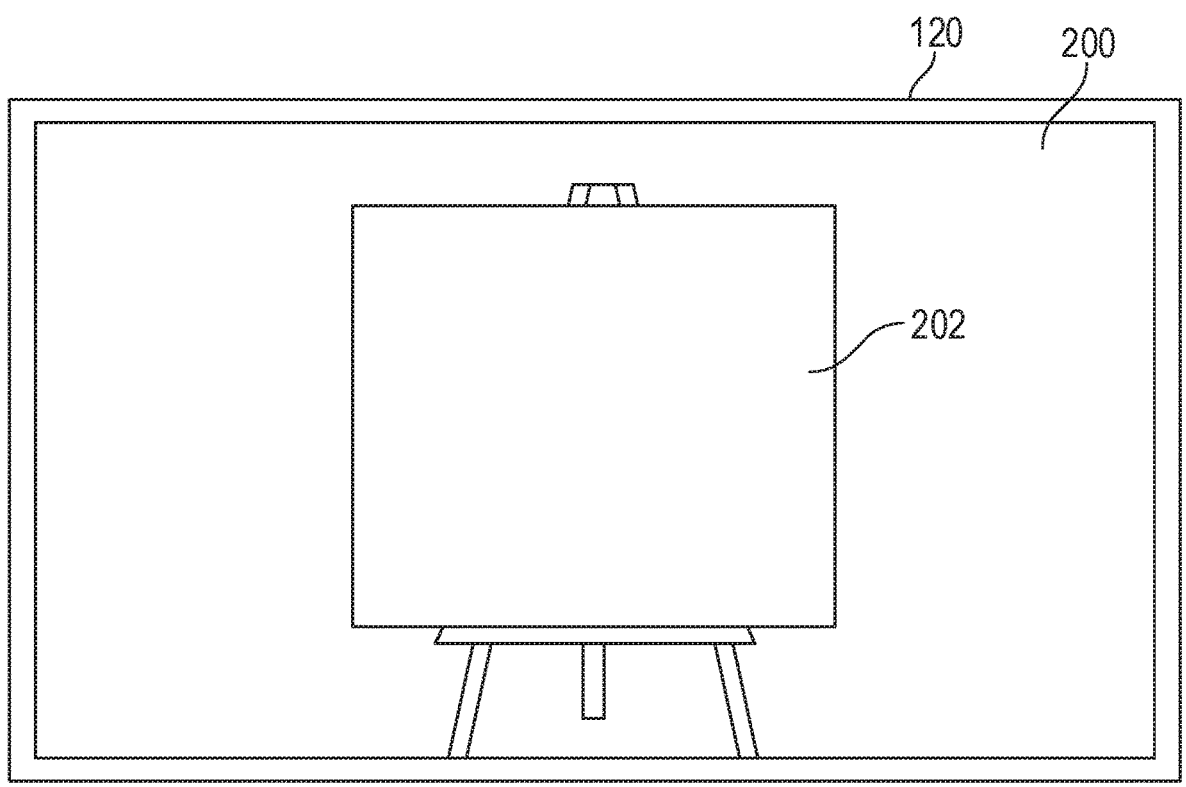
FIGS. 2-14 illustrate techniques for creating a drawing on a drawing surface within a computer-generated reality environment, in accordance with some embodiments.

FIG. 2 illustrates device 100a displaying (or causing display of), on display 120, a computer-generated reality (CGR) environment 200 (e.g., a VR or MR environment). The CGR environment includes a drawing surface for creating a drawing (e.g., a sketch, a painting). In some embodiments, the drawing surface is a computer-generated virtual image of a drawing surface (e.g., a virtual canvas, a virtual sheet of paper, a virtual sketchbook, a virtual drawing board) within the CGR environment. In other embodiments, the drawing surface is a real object that is viewed through the display (e.g., if the display is a transparent display or a pass-through display that displays pass-through video) and the device does not display a computer-generated drawing surface.

Figure 3:
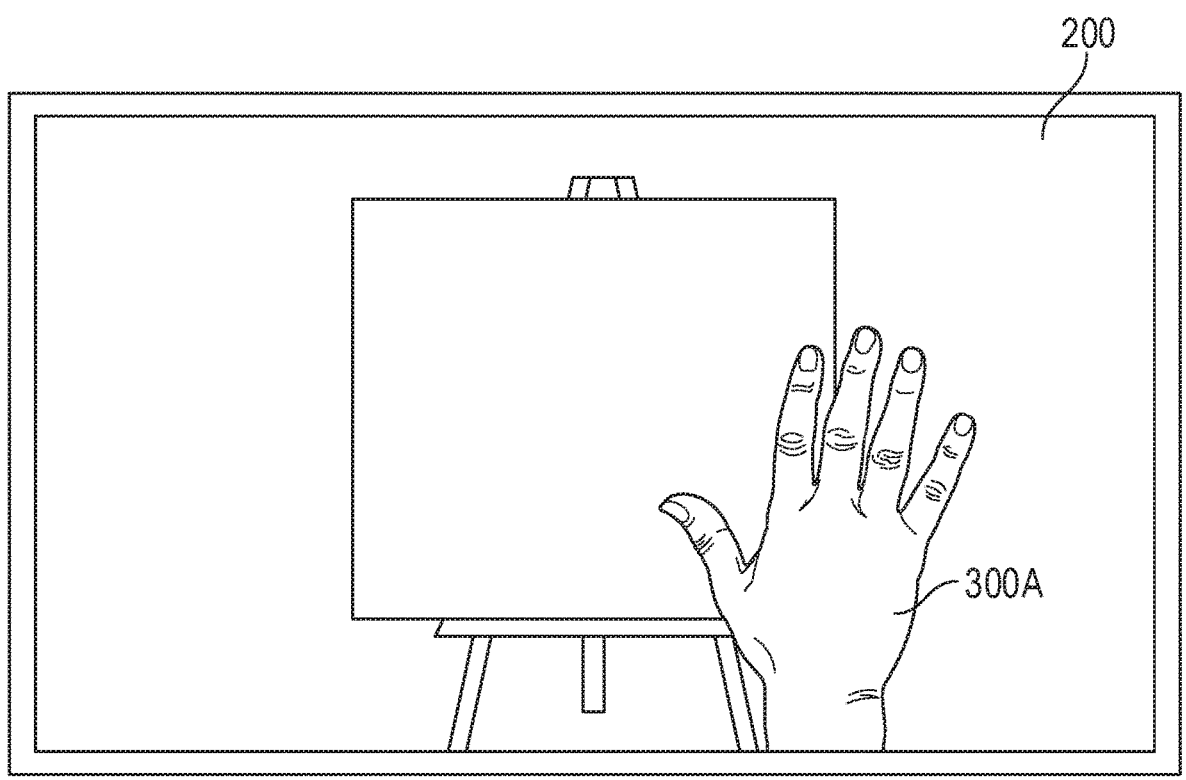

Turning to FIG. 3, while displaying (of causing display of), on display 120, CGR environment 200, device 100a detects, via the one or more sensor devices (e.g., image sensor(s) 108, orientation sensor(s) 110, location sensor(s) 116), a hand of the user within the field of detection of the one or more sensor devices. In some embodiments, in response to detecting the hand, the device projects (e.g., displays and simulates) a video representation 300A of the hand within the CGR environment 200, where the video representation simulates within the CGR environment movements of the user's hand in the real environment. In other embodiments, the hand of the user within the real world is visible through the display (e.g., if the display is a transparent display) and the device does not project a video representation of the hand. In some embodiments, device 100a simultaneously detects (and projects) both hands of the user within the CGR environment.

Device 100a, via the one or more sensor devices (e.g., image sensor(s) 108, orientation sensor(s) 110, location sensor(s) 116), detects and recognizes a plurality of different types of gestures (e.g., finger gestures, hand gestures) made by the user's hand. In some embodiments, the device detects and differentiates among the plurality of different types of gestures using one or more bone structures (e.g., a bone structure of the thumb and a bone structure of the index finger) of the hand as focal points and by modeling the shape of a hand at a particular point in time. Then, the device compares the generated model to a template model corresponding to a predefined type of gesture. If is determined that the generated model corresponds to (within a predetermined error range) the template model, the device determines that the detected gesture corresponding to the generated model is the predefined type of gesture. In other embodiments, instead of (or in addition to) utilizing one or more bone structures as the focal points, the device detects and differentiates (e.g., via machine learning) among the plurality of different types of gestures using a shape of the connected bones of the hand.

In some embodiments, device 100a detects a type of gesture made by the user's hand (e.g., a predefined type of finger orientation made by the user's hand). In some embodiments, determining the type of finger orientation involves counting the number of fingers (e.g., by counting one or more bone structures of the hand) involved in the gesture. In some embodiments, as described above, determining the type of finger orientation involves determining the shape made by one or more fingers of the user's hand (e.g., using one or more bone structures of the user's hand, by modeling the shape of the connected bones of the user's hand).

Figure 4:
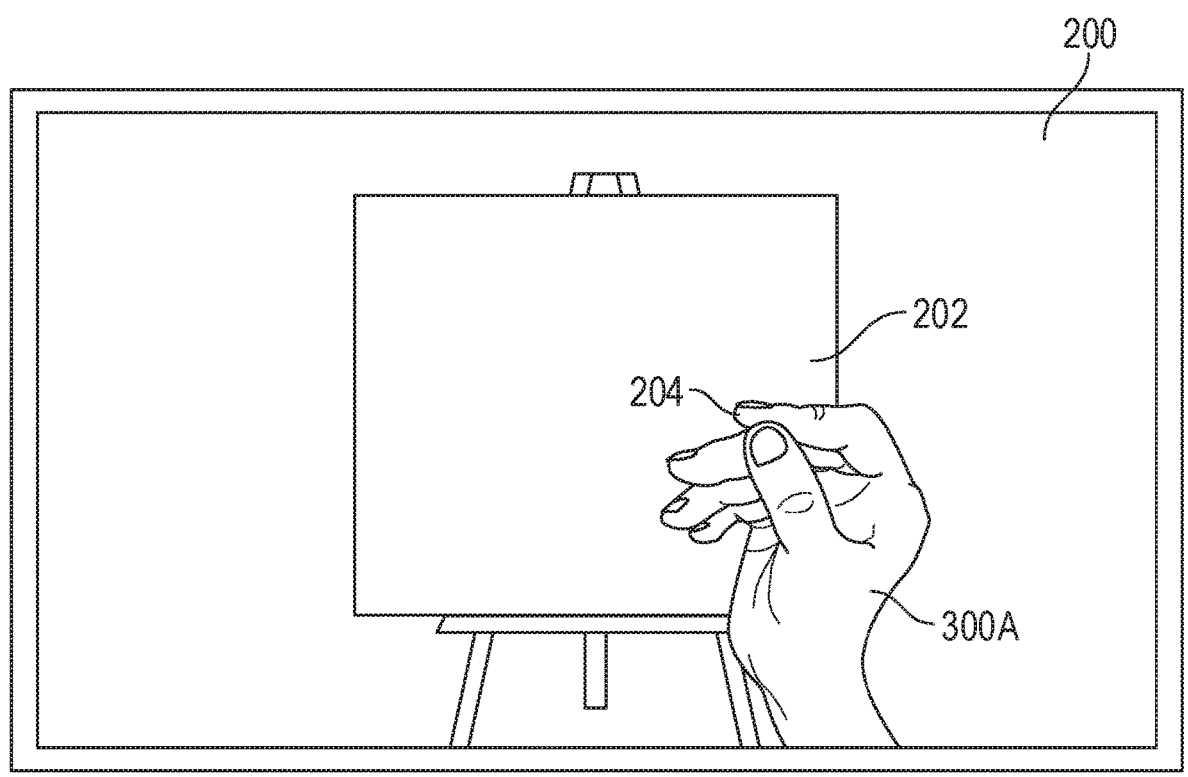

In FIG. 4, the type of gesture is a pinching gesture 204 (e.g., a gripping gesture, a gesture where two fingers of the hand are together and other fingers of the hand are not together, a pinching "o" shape as opposed to a "v" shape) similar to the gripping of a drawing tool (e.g., a pencil, a pen, a paintbrush). In some embodiments, the device projects pinching gesture 204 within CGR environment 200. In some examples, gesture 204 requires that the two fingers of the hand that come together (thus forming a pinching gesture) are the thumb and the pointing finger. In some examples, gesture 204 requires that the two fingers of the hand come together and stay pinched together for at least a predetermined period of time. In some examples, gesture 204 requires that the hand used for the gesture is a hand of a particular side (e.g., right hand or left hand).

Figure 5:
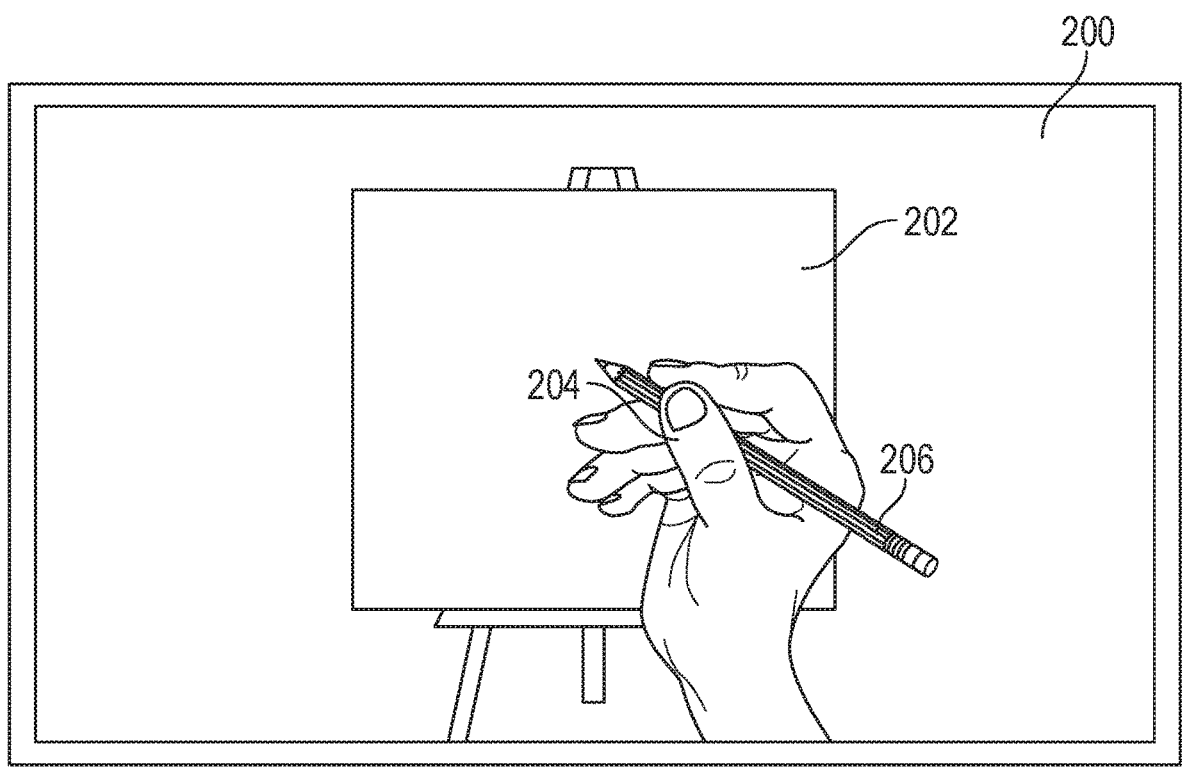

In some embodiments, as shown in FIG. 5, in response to detecting pinching gesture 204, device 100a displays (or causes display of) a drawing tool 206 (e.g., a pencil, a pen, a paintbrush), where the drawing tool is displayed such that it appears to be held and is controlled by the user's hand within CGR environment 200, thereby simulating the use of a real drawing tool in the real environment. In some examples, the displayed drawing tool is a pencil. In some examples, the displayed drawing tool is a pen. In some examples, the displayed drawing tool is a paintbrush. In some embodiments, the device enables the user to switch between different types of drawing tools (e.g., using different gestures or via a menu) within the CGR environment (e.g., using a predefined gesture type for switching among drawing tools).

Further in response to detecting pinching gesture 204, device 100a enables a drawing input mode for making a drawing input on drawing surface 202 using the displayed drawing tool within CGR environment 200. That is, the user is enabled to create a drawing on drawing surface 202 using drawing tool 206, similar to as if the user was, for example, making a real drawing on a real canvas using a real paintbrush in the real environment. In some embodiments, in response to detecting that the user's hand is no longer making pinching gesture 204, device 100a disables the drawing input mode and ceases display of drawing tool 206 within the CGR environment. In some examples, the drawing input mode does not enable making drawing inputs on surfaces other than drawing surface 202.

Figure 6:
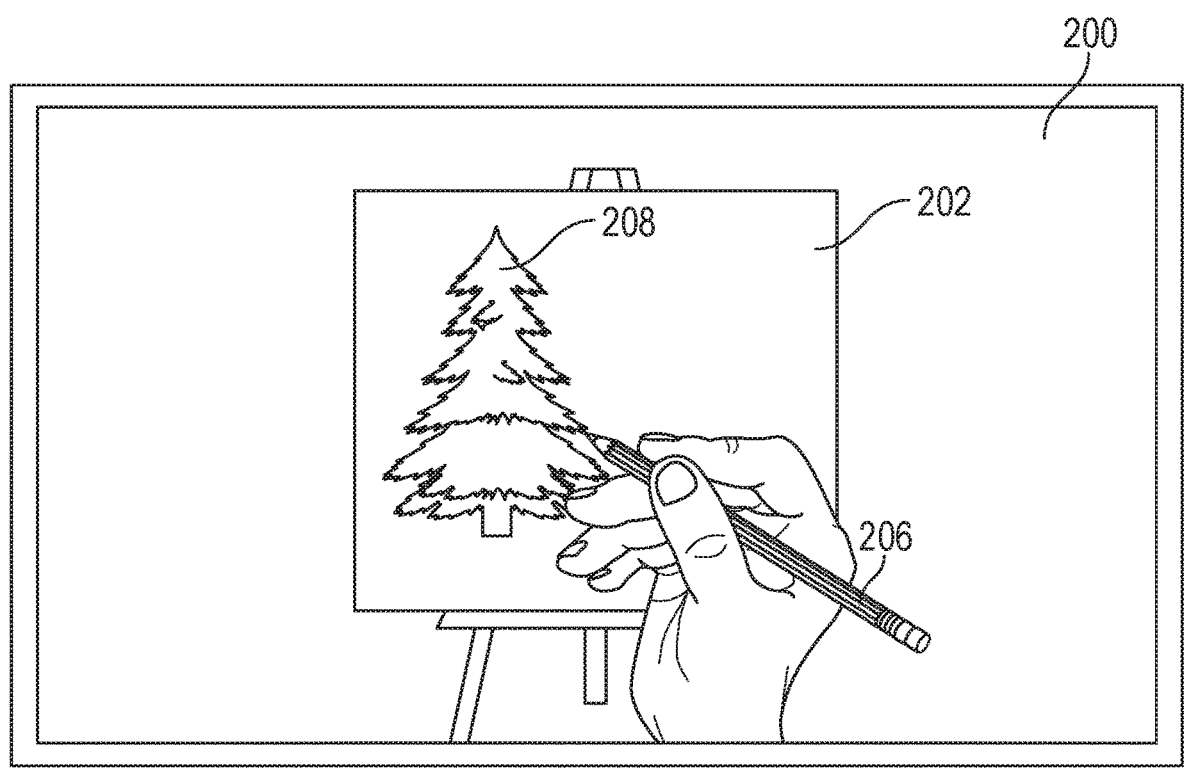

FIG. 6 illustrates the user creating a drawing 208 using drawing tool 206 on drawing surface 202 within CGR environment 200. As shown in FIG. 6, from the perspective of the user, the physical mechanics of creating the drawing within the CGR environment simulates physical mechanics of creating a real drawing within the real environment—the user uses the drawing tool to virtually draw (and thus create a virtual drawing) on drawing surface 202 within the CGR environment.

Figure 7:
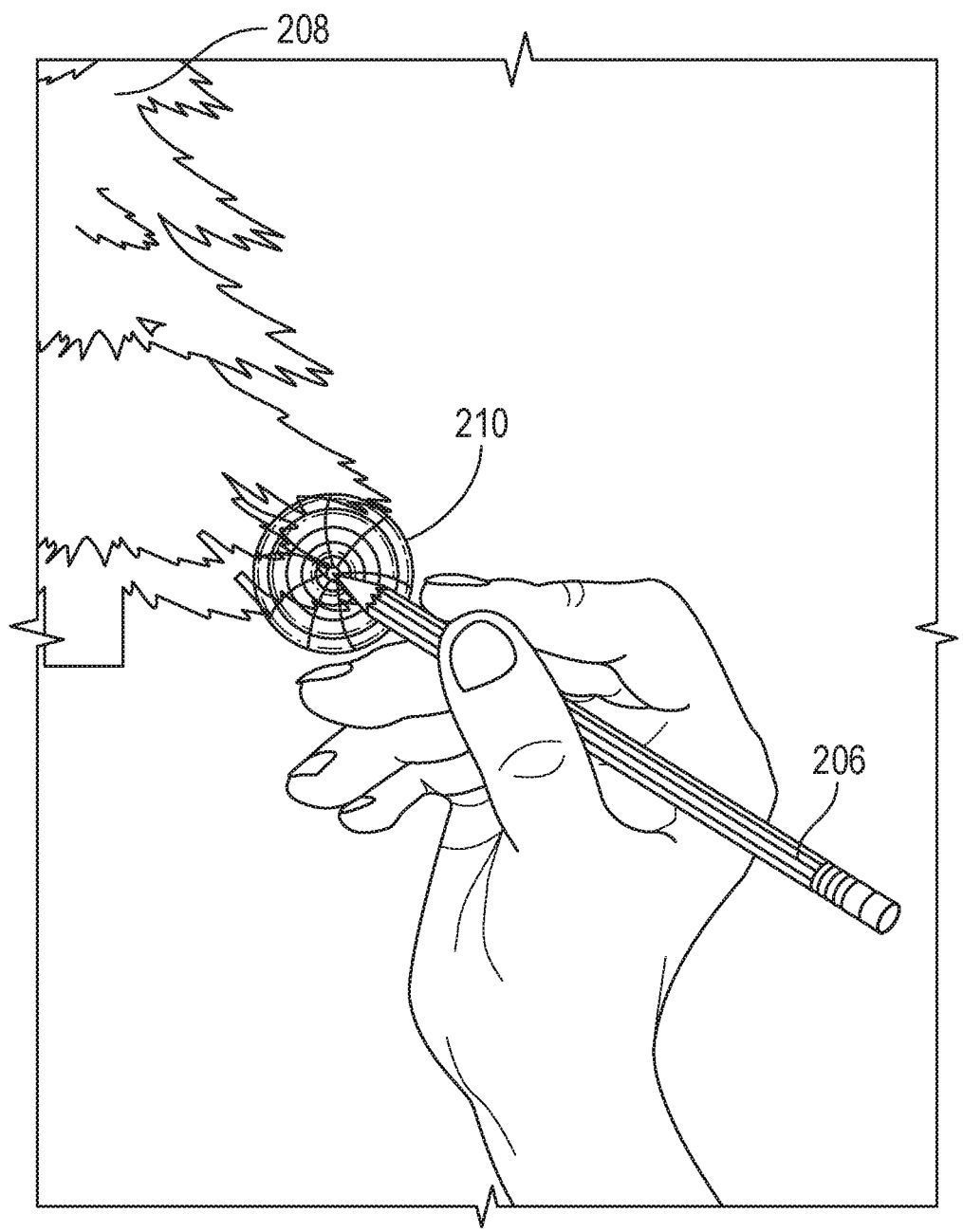

FIG. 7 illustrates a close-up view of drawing surface 202 of CGR environment 200 while the user is providing an input corresponding to a drawing on the drawing surface using drawing tool 206. In some embodiments, when the user provides an input on the drawing surface using the drawing tool, device 100a generates (and/or causes a different device, such as a headphone, to generate) one or more (visual and/or audio) corresponding feedbacks associated with the drawing.

In some embodiments, as shown in FIG. 7, the generated feedback includes a visual feedback comprising an indenting 210 of the drawing surface at (and around) the location on the drawing surface corresponding to the drawing when the user provides the input corresponding to the drawing. In some embodiments, the amount of indenting of the drawing surface corresponds to the amount of "force" being applied to the drawing surface by the drawing tool within the CGR environment—the "harder" the input provided by the user on the drawing surface to create the drawing, the larger the amount of corresponding indenting of the drawing surface in response to the drawing. Thus, in some embodiments, the amount of indenting of the drawing surface increases or decreases in accordance with increases and decreases, respectively, in the amount of force being applied to the drawing surface by drawing tool 206 within CGR environment 200.

In some embodiments, the amount of "force" being applied to the drawing surface by the drawing tool is determined by the change in distance between one or more focal points (e.g., of the drawing tool, of the user's hand, such as one or more bone structures of the user's hand) and (one or more locations on) the drawing surface from a first point in time to a second point in time. For example, if the distance between the one or more focal points and the drawing surface decreases from the first time point to the second time point, the device determines that the amount of "force" being applied to the drawing surface has increased, and if the distance between the one or more focal points and the drawing surface increases from the first time point to the second time point, the device determines that the "force" being applied to the drawing surface has decreased. In some embodiments, the amount of force being applied is based on the distance between the location (e.g., initial location) of the displayed drawing surface when the drawing tool is not engaged with the drawing surface and the current location of an end of the virtual drawing tool (e.g., a tip of a virtual pencil). Thus, as the end of the drawing tool continues to exceed the initial location of the drawing surface, the amount of force increases.

In some embodiments, the feedback includes an audio feedback (in addition to or alternatively to a visual feedback) corresponding to movements of drawing tool 206 on drawing surface 202. In some embodiments, if the selected drawing tool is a pencil, the audio feedback is a sketching (or scribbling) sound of a pencil being used on paper. In some embodiments, if the selected drawing tool is a painting brush, the audio feedback is a brushing sound of a brush being used on a canvas. In some embodiments, if the selected drawing tool is a pen, the audio feedback is a scribbling sound of a pen being used on paper. In some embodiments, the magnitude of the sound feedback corresponds to the amount of force being applied to the drawing surface by the drawing tool. Thus, in some embodiments, the magnitude of the audio feedback increases or decreases in accordance with increases and decreases, respectively, in the amount of force being applied to the drawing surface by the drawing tool within the CGR environment.

In some embodiments, device 100a detects, using the one or more sensor devices (e.g., image sensor(s) 108, orientation sensor(s) 110, location sensor(s) 116), a second type of gesture made by the user's hand (e.g., a gesture for changing an input type and/or a drawing tool type). In some embodiments, upon detecting the second type of gesture, if the device determines that the gesture corresponds to a predefined gesture for changing an input type (e.g., a stroke size if the drawing tool is a brush, a line type if the drawing tool is a pen), the device changes the input type of the currently-selected drawing tool from making a first input type (e.g., a thick brush stroke, a bold line) to making a second input type (e.g., a thin brush stroke, a blurry line). In some embodiments, upon detecting the second type of gesture, if the device determines that the gesture corresponds to a predefined gesture for changing the drawing tool type (e.g., from a pen to a brush or to a pencil), the device changes the currently-selected drawing tool from a first type of drawing tool (e.g., a pen) to a second type of drawing tool (e.g., a brush).

In some embodiments, device 100a detects, using the one or more sensor devices (e.g., image sensor(s) 108, orientation sensor(s) 110, location sensor(s) 116), a pinch intensity of the user's hand (e.g., a "strength" of the user's pinching gesture) while the user is making a drawing on drawing surface 202 using drawing tool 206. In some embodiments, in order to determine a change in pinch intensity of the user's hand, the device uses one or more bone structures of the hand as focal points to model a change in relative positions of the one or more bone structures of the hand at two different points in time. For example, the device models the shape of a detected hand, using one or more bone structures (e.g., a bone structure of the thumb and a bone structure of the index finger) as focal points, at a first point in time. Then, after a predetermined time period has passed, the device again models the shape of the detected hand, again using the one or more bone structures (e.g., the bone structure of the thumb and the bone structure of the index finger) as focal points, at a second point in time. Upon generating the two different models at the first and second time points, the device compares the two models to determine whether a distance between the focal points of the two models (e.g., the distance between the bone structure of the thumb from the first model to the second model and the distance between the bone structure of the index finger from the first model to the second model) has changed. In some examples, if it is determined that the distance between the focal points have decreased, the device determines that the pinch intensity of the gesture has increased from the first time point to the second time point, and if it is determined that the distance between the focal points have increased, the device determines that the pinch intensity of the gesture has decreased from the first time point to the second time point.

Figure 8:
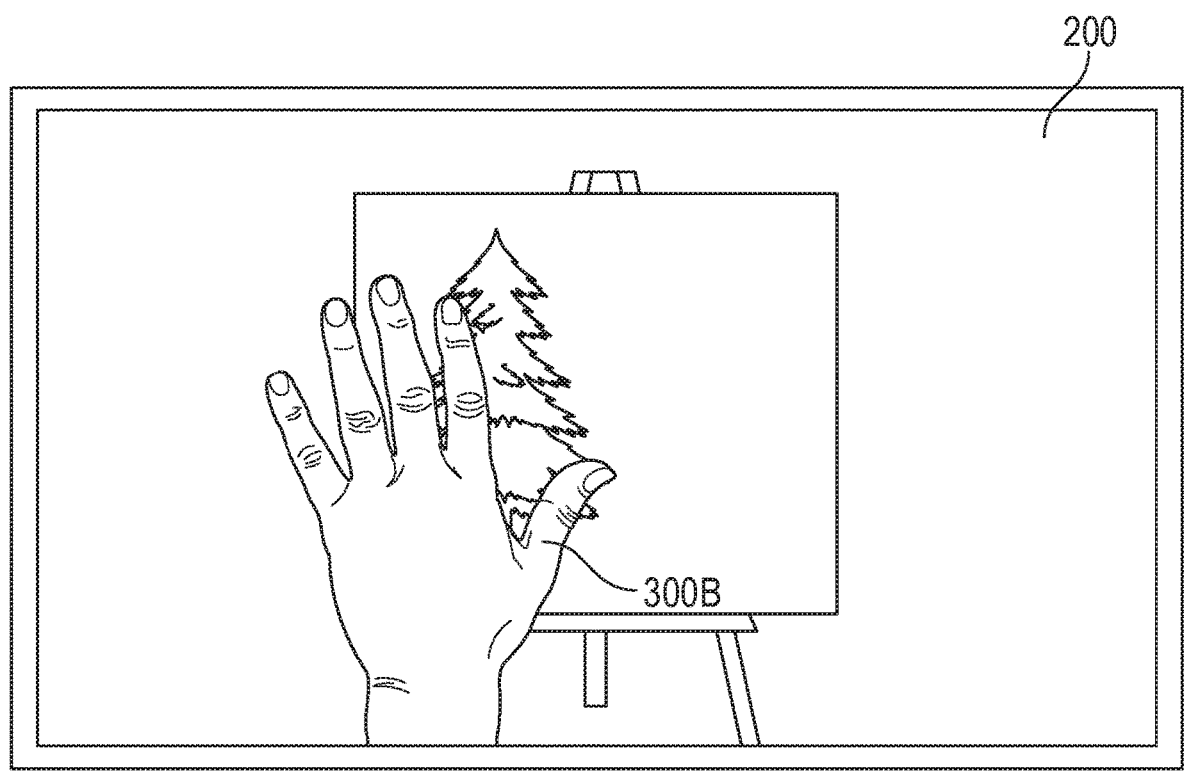

FIG. 8 illustrates a second video representation 300B projecting the other hand of the user in CGR environment 200, where the user's other hand is detected via the one or more sensor devices (e.g., image sensor(s) 108, orientation sensor(s) 110, location sensor(s) 116) of device 100a. As with video representation 300A of the user's hand, second video representation 300B of the user's other hand simulates the movement of the user's other hand in the real environment within the CGR environment. In some embodiments, the device simultaneously detects and simulates both hands of the user within the CGR environment. Thus, in some embodiments, the device simultaneously displays (or causes display of) video representation 300A of the user's hand and video representation 300B of the user's other hand within the CGR environment.

Figure 9:
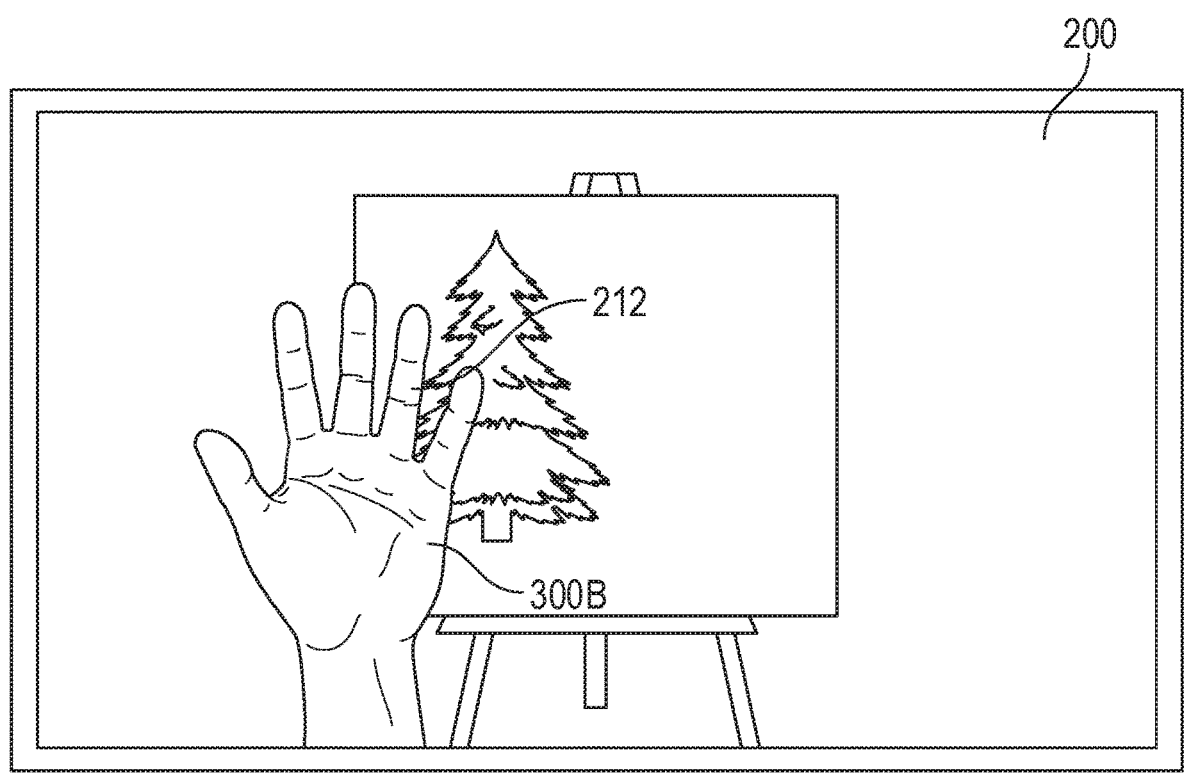

FIG. 9 illustrates device 100a detecting a type of gesture 212 (different from gesture 204) made by the user's other hand. In some embodiments, gesture 212 is an open-palm gesture. In some embodiments, gesture 212 is a palm-flip or hand-flip gesture (e.g., flipping the hand from the top-up to the palm-up position, turning of the hand to reveal the open palm), such as illustrated in the transition of hand 300B from FIG. 8 to FIG. 9.

Figure 10:
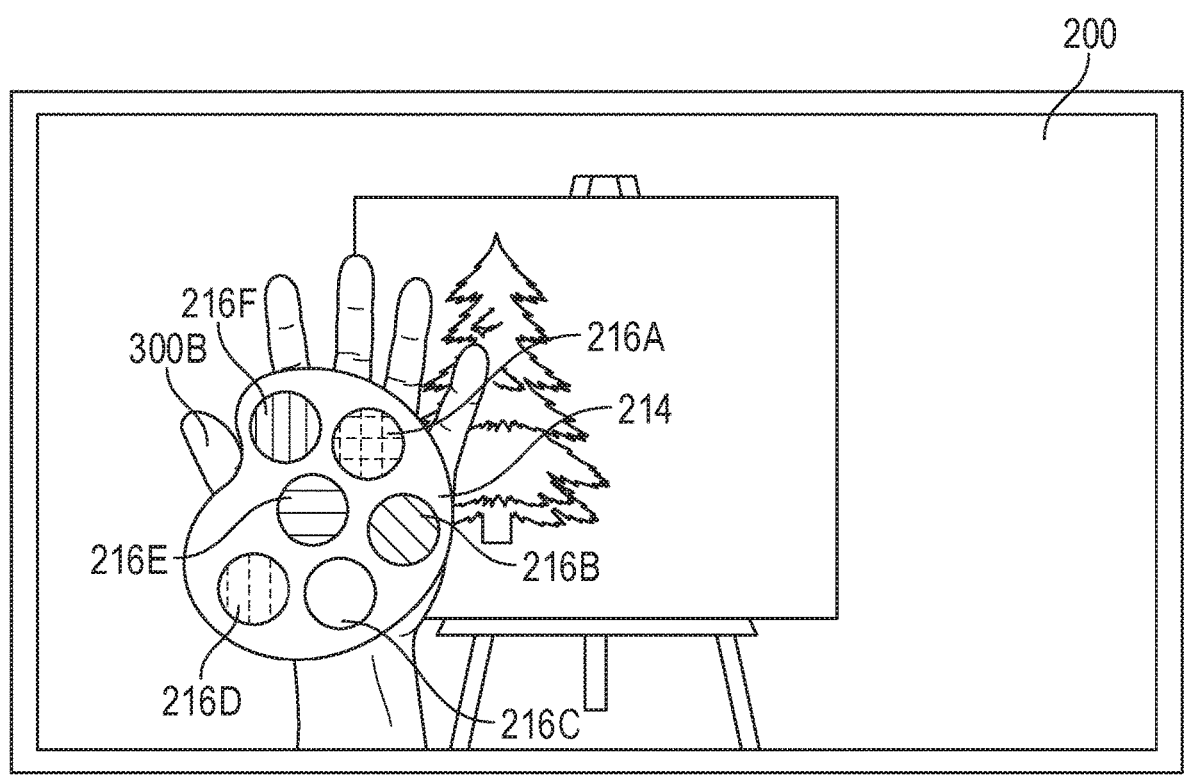

In FIG. 10, in response to detecting gesture 212 (different from gesture 204), device 100a displays (or causes display) within CGR environment 200 an input characteristic selection tool 214 for selecting and/or changing an input characteristic (e.g., input color, thickness, boldness, line type) of drawing tool 206. In some embodiments, input characteristic selection tool is a palette 214 having a plurality of color options 216A-F available for selection, as shown in FIG. 10.

In some embodiments, the position of the input characteristic selection tool (e.g., palette 214) within the CGR environment is controlled based on the user's other hand 300B (e.g., palette 214 is displayed such that it appears to rests on the palm of the user's other hand 300B). In some embodiments, as movement of the user's other hand is detected, the input characteristic selection tool continues to rest on the palm of the user's other hand 300B in the CGR environment by continuously tracking the movement of the user's other hand 300B within the CGR environment.

Figure 11:
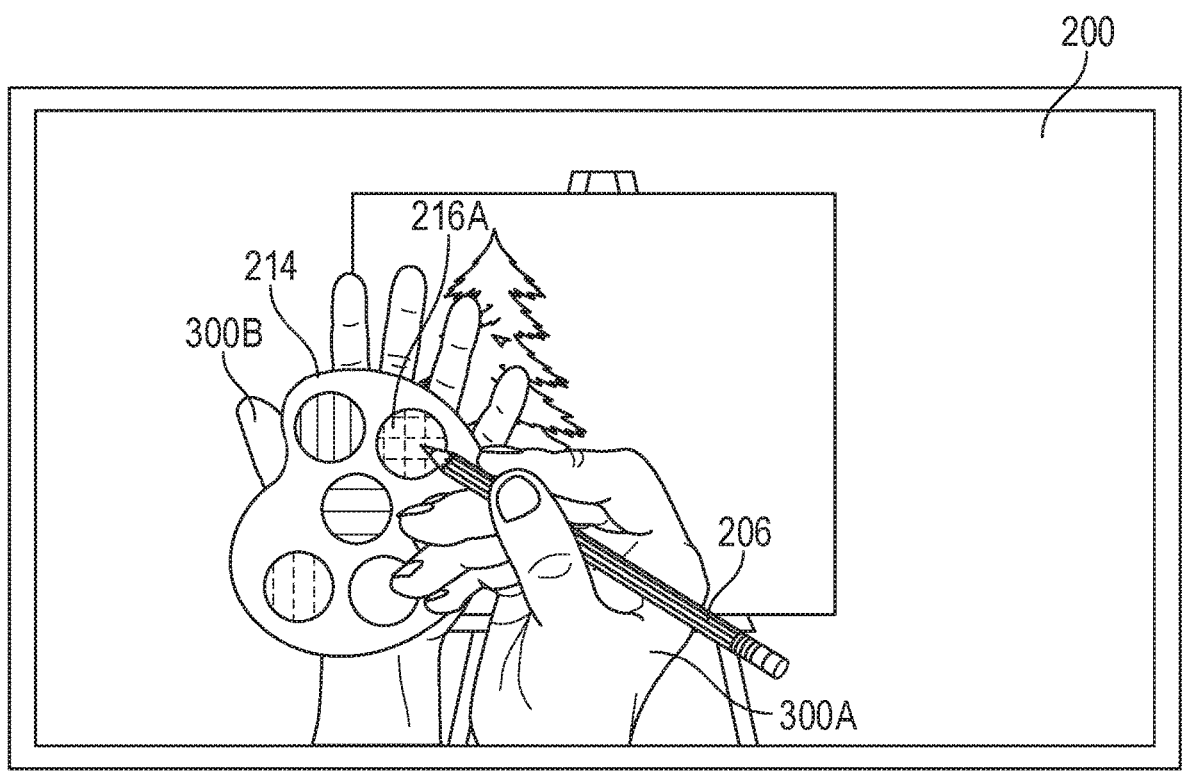

In FIG. 11, device 100a detects, via the one or more sensor devices (e.g., image sensor(s) 108, orientation sensor(s) 110, location sensor(s) 116), movement of the user's hands (e.g., represented by video representation 300A and video representation 300B) corresponding to a selection of color 216A (e.g., different from a currently-selected color) available from palette 214 using drawing tool 206 (e.g., by tapping the drawing tool on the color). In response to detecting the selection of color 216A, the device sets the input color of drawing tool 206 as the newly-selected color (e.g., color 216A). Thus, the user can easily, using the input characteristic selection tool (e.g., palette 214), change an input characteristic (e.g., input color, thickness, boldness, line type) of drawing tool 206 for drawing using the drawing tool.

Figure 12:
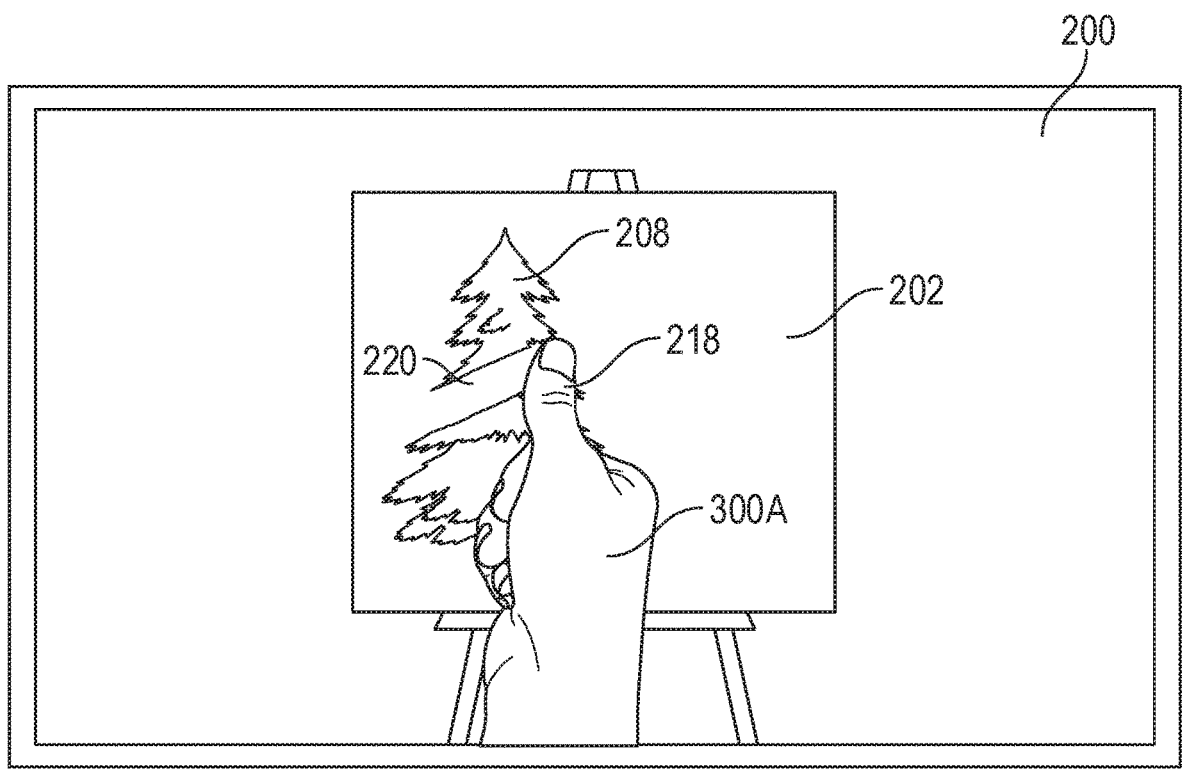

FIG. 12 illustrates device 100a detecting a gesture 218 (different from gesture 204 and gesture 212) made by the user's hand 300A and, optionally, displaying (or causing display of) gesture 218 within CGR environment 200. In some embodiments, gesture 218 is a thumb-up gesture. In some embodiments, in response to (and while) detecting gesture 218, the device enables an erasing mode controlled by the user's hand making gesture 218. When the erasing mode is enabled, the device is enabled to erase a portion 220 of drawing 208 on drawing surface 200 in response to detecting the user wiping the portion of the drawing using the hand making gesture 218 (e.g., using the thumb of the hand making gesture 218), as shown in FIG. 12. In some embodiments, in response to detecting an end of the gesture 218 (e.g., ceasing to detect gesture 218), the device disables the erasing mode controlled by the user's hand.

Figure 13:
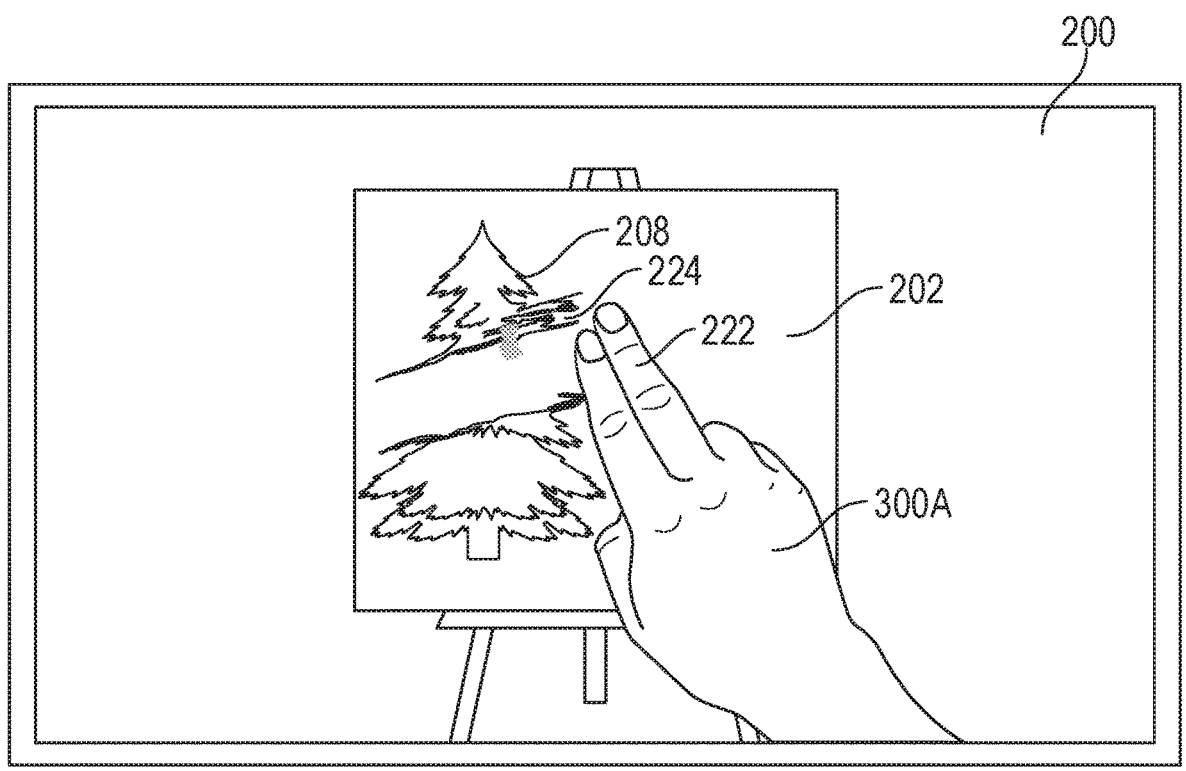

FIG. 13 illustrates device 100a detecting a gesture 222 (different from gesture 204, gesture 212, and gesture 218) made by the user's hand and, optionally, displaying (or causing display of) gesture 222 within CGR environment 200. In some embodiments, gesture 222 is a two-finger pointing gesture. In some embodiments, in response to (and while) detecting gesture 222, the device enables a smudging mode controlled by the user's hand making gesture 222. When the smudging mode is enabled, the device is enabled to smudge (or blur, or smear) a portion 224 of drawing 208 on drawing surface 200 by smudging portion 224 of drawing 208 based on detecting the hand making gesture 222 (e.g., using the tips of the two pointed fingers of the hand making gesture 222), as shown in FIG. 13. In some embodiments, in response to detecting an end of the gesture 222 (e.g., ceasing to detect gesture 222), the device disables the smudging mode controlled by the user's hand.

Figure 14:
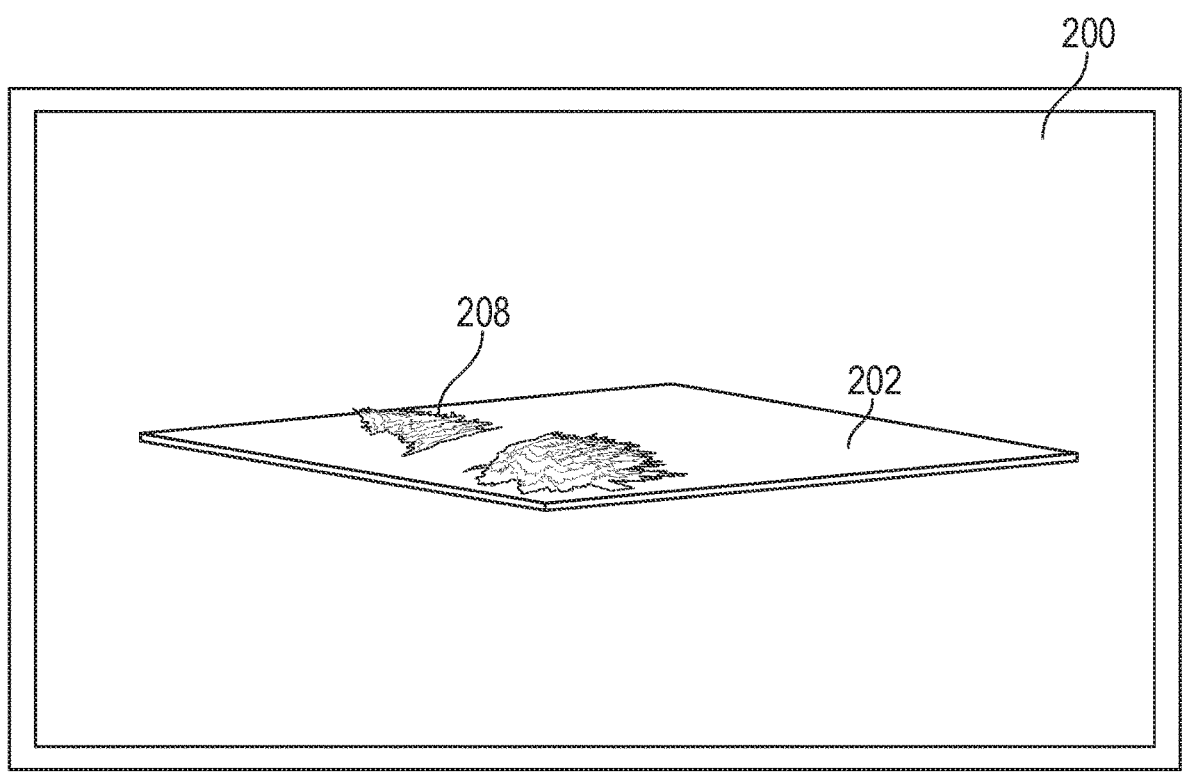

In some embodiments, device 100a detects movement of the user's hand causing a rotation of drawing surface 202 within CGR environment 200. Rotating the drawing surface within the CGR environment enables the user to view drawing 208 made on the drawing surface at various angles (e.g., from different reference points). FIG. 14 illustrates device 100a displaying (or causing display of) CGR environment 200 drawing surface 202 rotated to a side-angle view (from the perspective of the user). In some embodiments, drawing 208 comprises a plurality of drawing layers (e.g., a painting drawn using at least a first color and a second color, where the first color is applied over the second color on portions of the painting), thus providing a depth effect to the drawing, as shown in FIG. 14. The plurality of drawing layers comprising drawing is more easily visible and recognizable from the side-angle view (from the perspective of the user) than from a straight-on point of view (from the perspective of the user). In some embodiments, drawing 208 comprises a single drawing layer.

Figure 15A:
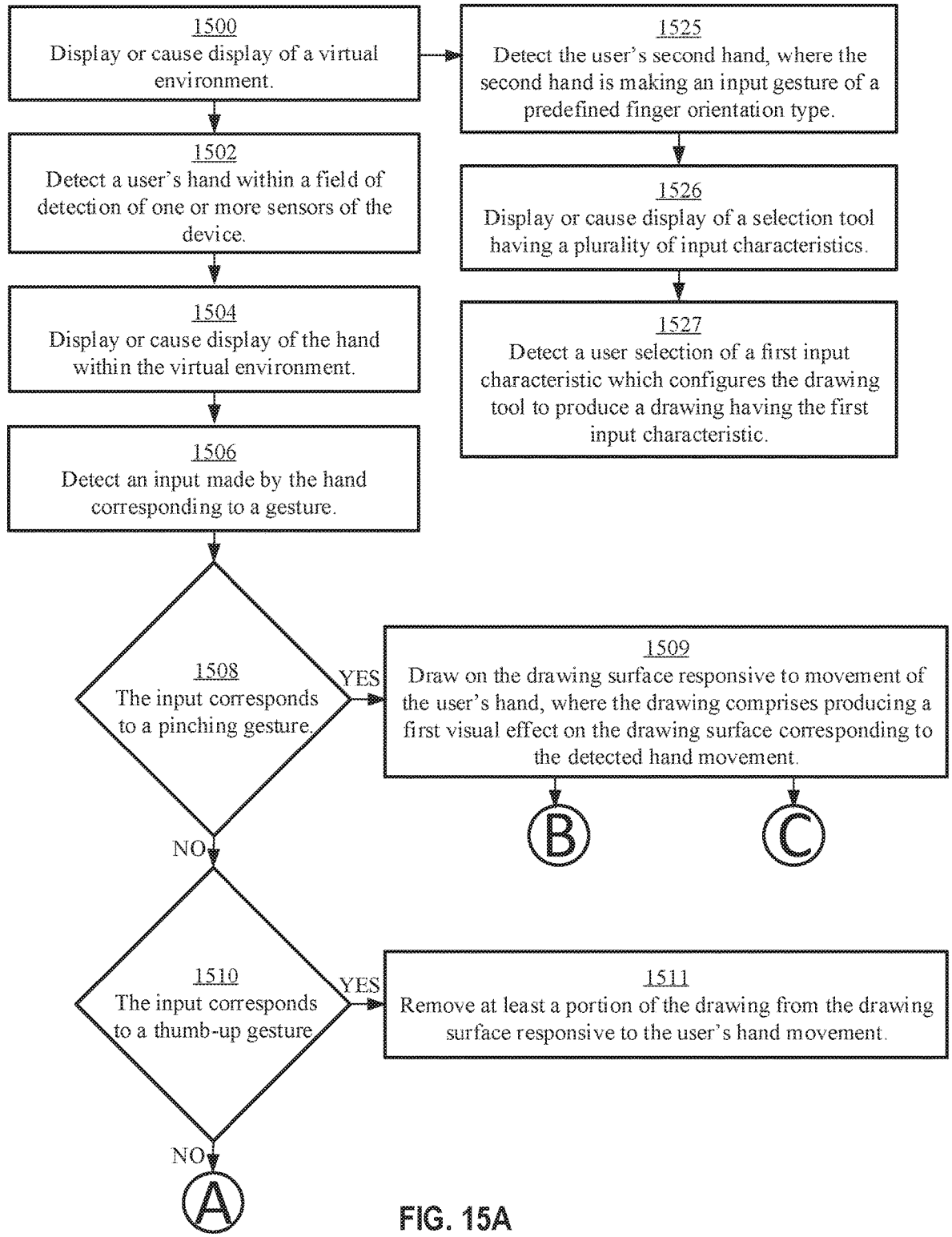
FIGS. 15A-15C are a flow diagram illustrating methods for creating a drawing on a drawing surface within a computer-generated reality environment, in accordance with some embodiments.
Figure 15B:
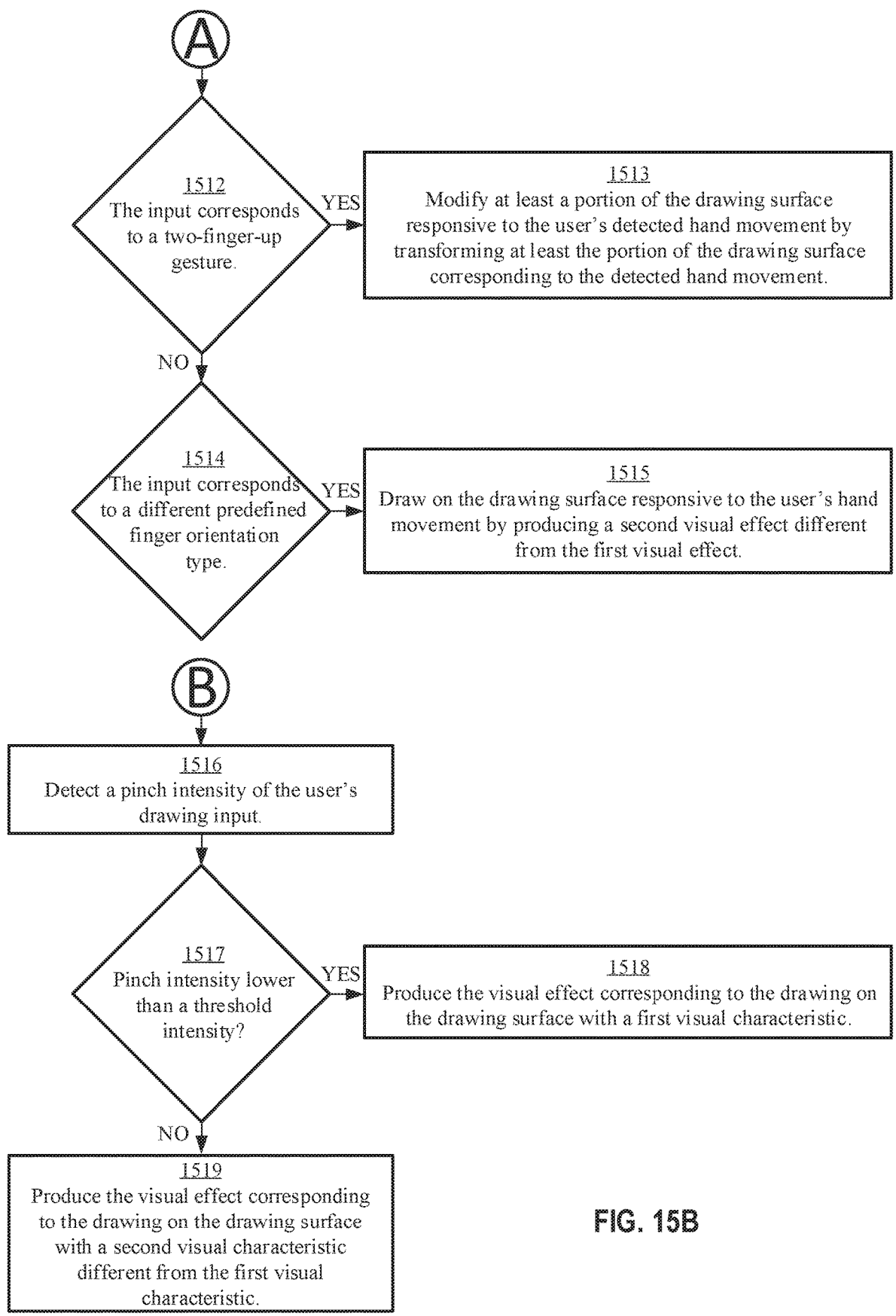
Figure 15C:
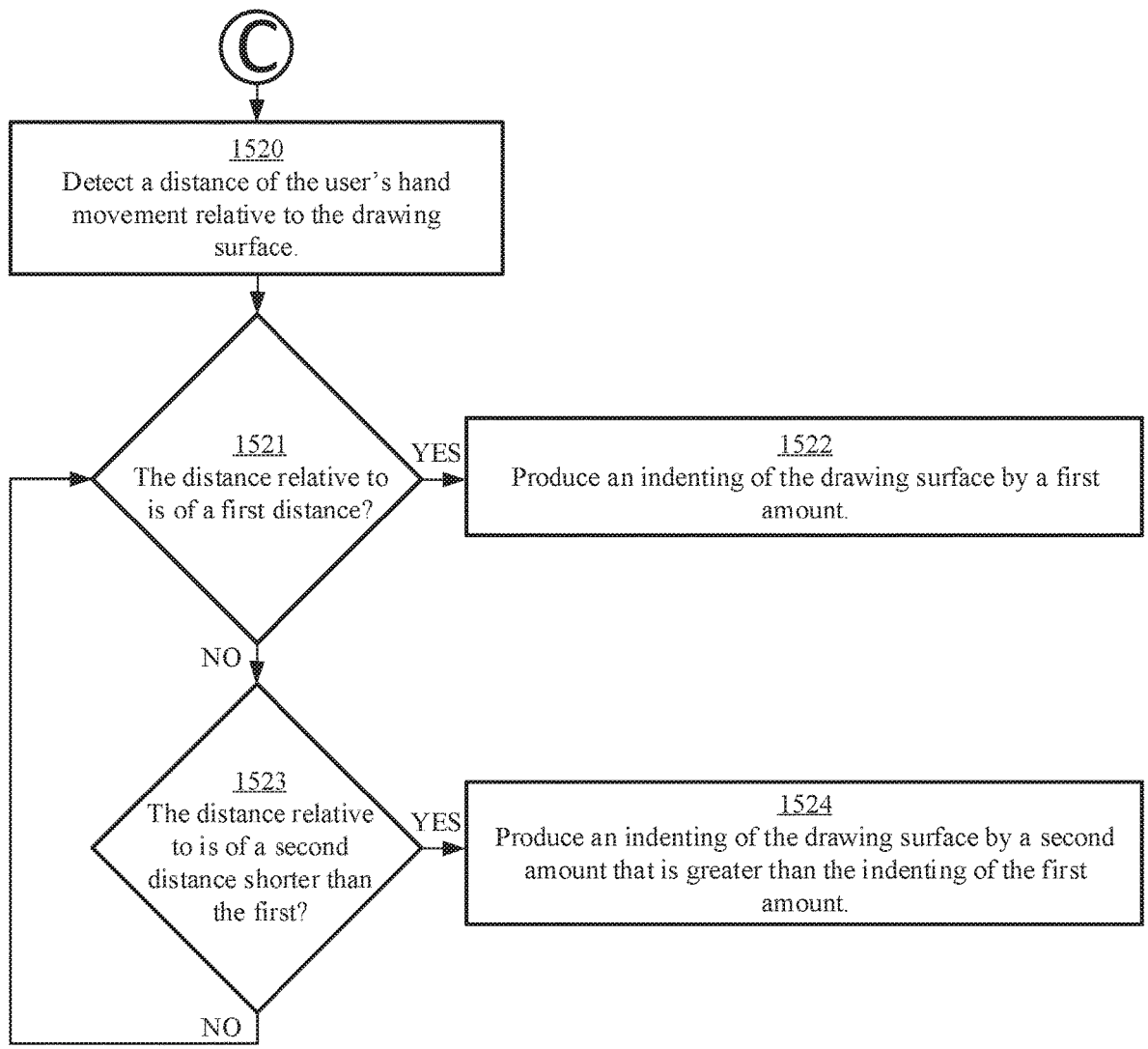

FIGS. 15A-15C are a flow diagram illustrating an exemplary process performed by an electronic device (e.g., device 100*a*). In some embodiments, the device has a display. In some embodiments, the display is a (at least partially) transparent display. In some embodiments, the device is connected to and in communication with a display that is separate from the device. In some embodiments, the device has one or more sensor devices (e.g., image sensor(s) 108, orientation sensor(s) 110, location sensor(s) 116). In some embodiments, the device is connected to and in communication with one or more sensor devices (e.g., image sensor(s) 108, orientation sensor(s) 110, location sensor(s) 116) that are separate from the device. In some embodiments, the electronic device is a head-mounted device. In some embodiments, the electronic device is separate from but is secured on (or configured to be secured to) a head-mounted device. In some embodiments, the electronic device includes one or more speakers (e.g., speaker(s) 118) for outputting audio. In some embodiments, the electronic device is connected (or configured to be connected) to (e.g., via wireless connection, via wired connection) and in communication (or configured to be in communication) with one or more speakers (e.g., speaker(s) 118) for outputting audio.

At block 1500, the electronic device (e.g., device 100*a*) displays or causes display of (e.g., on display 120) a CGR environment (e.g., CGR environment 200). The CGR environment includes a drawing surface (e.g., drawing surface 202), which may be a virtual drawing surface or a real drawing surface. In some examples, the drawing surface is a virtual canvas within the CGR environment.

At block 1502, while displaying or causing display of CGR environment 200, the electronic device (e.g., device 100*a*) detects, using the one or more sensor devices (e.g., image sensor(s) 108, orientation sensor(s) 110, location sensor(s) 116), a user's hand, where the hand is within a field of detection of the one or more sensor devices (e.g., image sensor(s) 108, orientation sensor(s) 110, location sensor(s) 116).

In some embodiments, at block 1504, in response to detecting the user's hand, the electronic device (e.g., device 100*a*) displays or causes display of (e.g., on display 120), a video representation (e.g., video representation 300A) of the hand within CGR environment 200, where the video representation of the hand simulates movements of the hand within the CGR environment.

At block 1506, the electronic device (e.g., device 100*a*) detects, using the one or more sensor devices (e.g., image sensor(s) 108, orientation sensor(s) 110, location sensor(s) 116), an input made by the hand corresponding to a gesture (e.g., gesture 204, gesture 212, gesture 218, gesture 222) of a predefined finger orientation type. In some embodiments, the input is a pinching gesture (e.g., gesture 204). In some embodiments, the input is a thumb-up gesture (e.g., gesture 218). In some embodiments, the input is a two-finger-up gesture or a two-finger-pointing (e.g., gesture 222).

At block 1508, upon detecting a pinching gesture (e.g., gesture 204), the electronic device (e.g., device 100*a*), at block 1509, draws on the drawing surface responsive to movement of the user's hand detected using the one or more image sensors (e.g., image sensor(s) 108, orientation sensor(s) 110, location sensor(s) 116), where drawing on the drawing surface comprises producing a first visual effect (e.g., a pen input, a pencil input, a brush input) on the drawing surface corresponding to the detected hand movement.

In some embodiments, at block 1510, upon detecting a thumb-up gesture (e.g., gesture 218), the electronic device (e.g., device 100*a*), at block 1511, removes (e.g., erases) at least a portion (e.g., a first portion, but not a second portion) of the drawing from the drawing surface responsive to the user's hand movement. In some embodiments, at block 1512, upon detecting a two-finger-up gesture (e.g., gesture 222), the electronic device (e.g., device 100*a*), at block 1513, modifies at least a portion of the drawing surface responsive to the user's detected hand movement by transforming (e.g., smudging, blurring) at least a portion of the drawing corresponding to the detected hand movement.

In some embodiments, at block 1514, the electronic device (e.g., device 100*a*) detects, using the one or more image sensors (e.g., image sensor(s) 108, orientation sensor(s) 110, location sensor(s) 116), an input of a predefined finger orientation type that is different from the pinching gesture (e.g., that is different from gesture 204, gesture 218, gesture 222). Upon detecting the input of the predefined type that is different from the pinching gesture, the device, at block 1515, draws on the drawing surface responsive to the user's hand movement by producing a second visual effect (e.g., that of a different drawing tool from the currently-selected drawing tool), different from the first visual effect.

In some embodiments, at block 1516, the electronic device (e.g., device 100*a*) detects, using the one or more image sensors (e.g., image sensor(s) 108, orientation sensor(s) 110, location sensor(s) 116), a pinch intensity of the user's drawing input (e.g., using pinching gesture 204). In accordance with a determination, at block 1517, that the pinch intensity of is lower than a threshold intensity, the device, at block 1518, produces the visual effect corresponding to the drawing on the drawing surface with a first visual characteristic (e.g., a first thickness). On the other hand, in accordance with a determination, at block 1517, that the pinch intensity of the user's drawing input is at least the threshold intensity, the device, at block 1519, produces the visual effect corresponding to the drawing on the drawing surface with a second visual characteristic (e.g., a second thickness) different from the first visual characteristic.

In some embodiments, at block 1520, the electronic device (e.g., device 100*a*) detects, using the one or more image sensors (e.g., image sensor(s) 108, orientation sensor(s) 110, location sensor(s) 116), a distance of the user's hand movement (e.g., using one or more focal points on the user's hand) relative to the drawing surface (e.g., drawing surface 202). In accordance with a determination, at block 1521, that the distance relative to the drawing surface of the user's hand movement is of a first distance, the device produces, at block 1522, an indenting of the drawing surface by a first amount (e.g., at a location on the drawing surface corresponding to the hand movement). In accordance with a determination, at block 1523, that the distance relative to the drawing surface of the hand movement is of a second distance that is shorter than the first distance (and thus the user appears to be "pressing harder" into the drawing surface), the device, at block 1524, produces an indenting of the drawing surface by a second amount that is greater than the indenting of the first amount (e.g., at a location on the drawing surface corresponding to the hand movement).

In some embodiments, at block 1525, the electronic device (e.g., device 100*a*) detects, using the one or more sensor devices (e.g., image sensor(s) 108, orientation sensor(s) 110, location sensor(s) 116), a second hand of the user, where the second hand is making an input gesture of a predefined finger orientation type (e.g., different from gestures 204, 218, and 222), such as an open-palm gesture or a palm-flip or hand-flip gesture (e.g., gesture 212). In some embodiments, upon detecting the input gesture, the device, at block 1526, displays or causes display of (e.g., on display 202) a selection tool, such as an input characteristic selection tool (e.g., a palette, such as palette 214) having a plurality of input characteristics (e.g., a plurality of different colors). In some embodiments, at block 1527, the device detects a user selection (e.g., using drawing tool 206 on the other hand) of a first input characteristic (e.g., a first color) which configures the drawing tool produce a drawing having the newly-selected first input characteristic (e.g., the newly-selected color) as opposed to the previous input characteristic (e.g., the previous color).

In some embodiments, the drawing (e.g., drawing 208) on the drawing surface (e.g., drawing surface 202) includes a first drawing layer (e.g., from an initial drawing on the drawing surface using a first input characteristic) and a second drawing layer overlaying the first drawing layer (e.g., from a subsequent drawing on the drawing surface using a second input characteristic at a region that at least partially overlays the first drawing layer). The electronic device (e.g., device 100*a*) then detects, using the one or more sensor devices (e.g., image sensor(s) 108, orientation sensor(s) 110, location sensor(s) 116), a movement of the user's hand corresponding to a rotating of the drawing surface within the CGR environment (e.g., such that the drawing surface is in a flat position or a resting position on a surface). Based on this position of the drawing surface, the user can more easily view a side-angle view of the drawing on the drawing surface. In turn, from this side angle view of the drawing, the user can easily visualize (and thus visually distinguish between) the first layer of the drawing and the second layer of the drawing.

The foregoing descriptions of specific embodiments and processes, as described with reference to FIGS. 2-14 and FIGS. 15A-15C, respectively, have been presented for purposes of illustration and description. They are not intended to be exhaustive or to limit the scope of the claims to the precise forms disclosed, and it should be understood that many modifications and variations are possible in light of the above descriptions.

What is claimed is:

1. An electronic device, comprising:
 one or more processors; and
 memory storing one or more programs configured to be executed by the one or more processors, the one or more programs including instructions for:
  causing display, on a display, of a drawing surface within a computer-generated reality environment;
  detecting, using one or more image sensors, a first input from a first hand, wherein the first input includes a first predefined finger orientation type; and
  in accordance with a determination that the first input from the first hand includes the first predefined finger orientation type:
   causing display, on the display, of a drawing tool that is controlled within the computer-generated reality environment by hand movement of the first hand detected using the one or more image sensors, wherein the drawing tool is moved within the computer-generated reality environment in accordance with the detected hand movement; and
   drawing on the drawing surface within the computer-generated reality environment responsive to the hand movement of the first hand detected using the one or more image sensors, wherein drawing on the drawing surface within the computer-generated reality environment responsive to the hand movement of the first hand comprises producing a visual effect on the drawing surface within the computer-generated reality environment corresponding to the detected hand movement.

2. The electronic device of claim 1, wherein the one or more programs further include instructions for:
 detecting, using the one or more image sensors, a second input including a second predefined finger orientation type; and
 upon detecting the second input, removing on the drawing surface within the computer-generated reality environment responsive to second hand movement detected using the one or more image sensors, wherein removing on the drawing surface within the computer-generated reality environment comprises removing the drawn visual effect on the drawing surface within the computer-generated reality environment corresponding to the detected second hand movement.

3. The electronic device of claim 1, wherein the one or more programs further include instructions for:
 detecting, using the one or more image sensors, a third input including a third predefined finger orientation type; and
 upon detecting the third input, modifying on the drawing surface within the computer-generated reality environment responsive to third hand movement detected using the one or more image sensors, wherein modifying on the drawing surface within the computer-generated reality environment comprises transforming the drawn visual effect on the drawing surface within the computer-generated reality environment corresponding to the detected third hand movement.

4. The electronic device of claim 1, wherein the one or more programs further include instructions for:
 detecting, using the one or more image sensors, a fourth input including a fourth predefined finger orientation type; and
 upon detecting the fourth input, drawing on the drawing surface within the computer-generated reality environment responsive to fourth hand movement detected using the one or more image sensors, wherein drawing on the drawing surface within the computer-generated reality environment responsive to the fourth hand movement comprises producing a second visual effect on the drawing surface within the computer-generated reality environment corresponding to the detected fourth hand movement.

5. The electronic device of claim 1, wherein the one or more programs further include instructions for:
 detecting, using the one or more image sensors, a pinch intensity of the hand movement corresponding to the first input;
 in accordance with a determination that the pinch intensity of the hand movement is lower than a threshold intensity, producing the visual effect on the drawing surface within the computer-generated reality environment having a first visual characteristic; and in accordance with a determination that the pinch intensity of the hand movement is at least the threshold intensity, producing the visual effect on the drawing surface within the computer-generated reality environment having a second visual characteristic different from the first visual characteristic.

6. The electronic device of claim 1, wherein the one or more programs further include instructions for:
   detecting, using the one or more image sensors, a distance relative to the drawing surface of the hand movement corresponding to the first input within the computer-generated reality environment;
   in accordance with a determination that the distance relative to the drawing surface of the hand movement within the computer-generated reality environment is a first distance, producing an indenting of the drawing surface by a first amount; and
   in accordance with a determination that the distance relative to the drawing surface of the hand movement within the computer-generated reality environment is a second distance shorter than the first distance, producing an indenting of the drawing surface by a second amount greater than the first amount.

7. The electronic device of claim 1, wherein the one or more programs further include instructions for:
   detecting, using the one or more image sensors, a fifth input including a first predefined hand gesture type;
   upon detecting the fifth input, causing display, on the display, of a selection tool within the computer-generated reality environment having a plurality of input characteristics;
   detecting, using the one or more image sensors, a selection of a first input characteristic of the plurality of input characteristics; and
   subsequent to detecting the selection of the first input characteristic, producing the visual effect on the drawing surface within the computer-generated reality environment, wherein the visual effect includes the first input characteristic.

8. The electronic device of claim 7, wherein the selection tool is a palette, and wherein the plurality of input characteristics comprises a plurality of colors.

9. The electronic device of claim 1, wherein determining a predefined finger orientation type of an input includes detecting, using the one or more image sensors, a number of fingers forming the predefined finger orientation type.

10. The electronic device of claim 1, wherein determining a predefined finger orientation type of an input includes detecting, using the one or more image sensors, orientations of one or more fingers forming the predefined finger orientation type.

11. The electronic device of claim 1, wherein determining a predefined finger orientation type of an input includes detecting, using the one or more image sensors, an orientation of a first finger relative to a second finger forming the predefined finger orientation type.

12. The electronic device of claim 1, wherein the drawing surface within the computer-generated reality environment corresponds to a visual of a physical object, and wherein the produced visual effect is a computer-generated graphical effect.

13. The electronic device of claim 1, wherein the drawing surface within the computer-generated reality environment corresponds to a computer-generated graphical animation of a virtual surface, and wherein the produced visual effect is a computer-generated graphical effect.

14. The electronic device of claim 1, wherein the drawing surface within the computer-generated reality environment corresponds to a computer-generated graphical animation of a virtual object corresponding to a physical object, and wherein the produced visual effect is a computer-generated graphical effect.

15. A non-transitory computer-readable storage medium storing one or more programs configured to be executed by one or more processors of an electronic device, the one or more programs including instructions for:
   causing display, on a display, of a drawing surface within a computer-generated reality environment;
   detecting, using one or more image sensors, a first input from a first hand, wherein the first input includes a first predefined finger orientation type; and
   in accordance with a determination that the first input from the first hand includes the first predefined finger orientation type:
      causing display, on the display, of a drawing tool that is controlled within the computer-generated reality environment by hand movement of the first hand detected using the one or more image sensors, wherein the drawing tool is moved within the computer-generated reality environment in accordance with the detected hand movement; and
      drawing on the drawing surface within the computer-generated reality environment responsive to the hand movement of the first hand detected using the one or more image sensors, wherein drawing on the drawing surface within the computer-generated reality environment responsive to the hand movement of the first hand comprises producing a visual effect on the drawing surface within the computer-generated reality environment corresponding to the detected hand movement.

16. The non-transitory computer-readable storage medium of claim 15, wherein the one or more programs further include instructions for:
   detecting, using the one or more image sensors, a second input including a second predefined finger orientation type; and
   upon detecting the second input, removing on the drawing surface within the computer-generated reality environment responsive to second hand movement detected using the one or more image sensors, wherein removing on the drawing surface within the computer-generated reality environment comprises removing the drawn visual effect on the drawing surface within the computer-generated reality environment corresponding to the detected second hand movement.

17. The non-transitory computer-readable storage medium of claim 15, wherein the one or more programs further include instructions for:
   detecting, using the one or more image sensors, a third input including a third predefined finger orientation type; and
   upon detecting the third input, modifying on the drawing surface within the computer-generated reality environment responsive to third hand movement detected using the one or more image sensors, wherein modifying on the drawing surface within the computer-generated reality environment comprises transforming the drawn visual effect on the drawing surface within the computer-generated reality environment corresponding to the detected third hand movement.

18. The non-transitory computer-readable storage medium of claim 15, wherein the one or more programs further include instructions for:
- detecting, using the one or more image sensors, a fourth input including a fourth predefined finger orientation type; and
- upon detecting the fourth input, drawing on the drawing surface within the computer-generated reality environment responsive to fourth hand movement detected using the one or more image sensors, wherein drawing on the drawing surface within the computer-generated reality environment responsive to the fourth hand movement comprises producing a second visual effect on the drawing surface within the computer-generated reality environment corresponding to the detected fourth hand movement.

19. The non-transitory computer-readable storage medium of claim 15, wherein the one or more programs further include instructions for:
- detecting, using the one or more image sensors, a pinch intensity of the hand movement corresponding to the first input;
- in accordance with a determination that the pinch intensity of the hand movement is lower than a threshold intensity, producing the visual effect on the drawing surface within the computer-generated reality environment having a first visual characteristic; and
- in accordance with a determination that the pinch intensity of the hand movement is at least the threshold intensity, producing the visual effect on the drawing surface within the computer-generated reality environment having a second visual characteristic different from the first visual characteristic.

20. The non-transitory computer-readable storage medium of claim 15, wherein the one or more programs further include instructions for:
- detecting, using the one or more image sensors, a distance relative to the drawing surface of the hand movement corresponding to the first input within the computer-generated reality environment;
- in accordance with a determination that the distance relative to the drawing surface of the hand movement within the computer-generated reality environment is a first distance, producing an indenting of the drawing surface by a first amount; and
- in accordance with a determination that the distance relative to the drawing surface of the hand movement within the computer-generated reality environment is a second distance shorter than the first distance, producing an indenting of the drawing surface by a second amount greater than the first amount.

21. The non-transitory computer-readable storage medium of claim 15, wherein the one or more programs further include instructions for:
- detecting, using the one or more image sensors, a fifth input including a first predefined hand gesture type;
- upon detecting the fifth input, causing display, on the display, of a selection tool within the computer-generated reality environment having a plurality of input characteristics;
- detecting, using the one or more image sensors, a selection of a first input characteristic of the plurality of input characteristics; and
- subsequent to detecting the selection of the first input characteristic, producing the visual effect on the drawing surface within the computer-generated reality environment, wherein the visual effect includes the first input characteristic.

22. A method, comprising:
- causing display, on a display, of a drawing surface within a computer-generated reality environment;
- detecting, using one or more image sensors, a first input from a first hand, wherein the first input includes a first predefined finger orientation type; and
- in accordance with a determination that the first input from the first hand includes the first predefined finger orientation type:
  - causing display, on the display, of a drawing tool that is controlled within the computer-generated reality environment by hand movement of the first hand detected using the one or more image sensors, wherein the drawing tool is moved within the computer-generated reality environment in accordance with the detected hand movement; and
  - drawing on the drawing surface within the computer-generated reality environment responsive to the hand movement of the first hand detected using the one or more image sensors, wherein drawing on the drawing surface within the computer-generated reality environment responsive to the hand movement of the first hand comprises producing a visual effect on the drawing surface within the computer-generated reality environment corresponding to the detected hand movement.

23. The method of claim 22, further comprising:
- detecting, using the one or more image sensors, a second input including a second predefined finger orientation type; and
- upon detecting the second input, removing on the drawing surface within the computer-generated reality environment responsive to second hand movement detected using the one or more image sensors, wherein removing on the drawing surface within the computer-generated reality environment comprises removing the drawn visual effect on the drawing surface within the computer-generated reality environment corresponding to the detected second hand movement.

24. The method of claim 22, further comprising:
- detecting, using the one or more image sensors, a third input including a third predefined finger orientation type; and
- upon detecting the third input, modifying on the drawing surface within the computer-generated reality environment responsive to third hand movement detected using the one or more image sensors, wherein modifying on the drawing surface within the computer-generated reality environment comprises transforming the drawn visual effect on the drawing surface within the computer-generated reality environment corresponding to the detected third hand movement.

25. The method of claim 22, further comprising:
- detecting, using the one or more image sensors, a fourth input including a fourth predefined finger orientation type; and
- upon detecting the fourth input, drawing on the drawing surface within the computer-generated reality environment responsive to fourth hand movement detected using the one or more image sensors, wherein drawing on the drawing surface within the computer-generated reality environment responsive to the fourth hand movement comprises producing a second visual effect on the drawing surface within the computer-generated reality environment corresponding to the detected fourth hand movement.

\* \* \* \* \*